(12) United States Patent
Chen

(10) Patent No.: US 7,907,618 B2
(45) Date of Patent: Mar. 15, 2011

(54) TELECOMMUNICATIONS SYSTEM

(75) Inventor: Xiaobao Chen, Swindon (GB)

(73) Assignee: Orange SA, Paris (FR)

( * ) Notice: Subject to any disclaimer, the term of this patent is extended or adjusted under 35 U.S.C. 154(b) by 783 days.

(21) Appl. No.: 11/587,073

(22) PCT Filed: Apr. 19, 2005

(86) PCT No.: PCT/GB2005/001507
§ 371 (c)(1),
(2), (4) Date: Mar. 29, 2007

(87) PCT Pub. No.: WO2005/104480
PCT Pub. Date: Nov. 3, 2005

(65) Prior Publication Data
US 2007/0258399 A1 Nov. 8, 2007

(30) Foreign Application Priority Data

Apr. 21, 2004 (GB) .................................. 0408890.2

(51) Int. Cl.
*H04L 12/28* (2006.01)
*H04L 12/56* (2006.01)

(52) U.S. Cl. .................................................. 370/395.5

(58) Field of Classification Search ................ 370/395.5
See application file for complete search history.

(56) References Cited

U.S. PATENT DOCUMENTS 6,708,219 B1  3/2004  Borella et al. ................. 709/245
(Continued)

FOREIGN PATENT DOCUMENTS

WO  WO 02/067605 A1  8/2002
(Continued)

OTHER PUBLICATIONS

X. Chen et al., "Problem Statement for MIPv6 Interactions with GPRS/UMTS Packet Filtering; Intenert draft; draft-chen-mip6-gprs-00.txt" IETF MIP6 Working Group, Feb. 5, 2004.*

(Continued)

*Primary Examiner* — Marivelisse Santiago-Cordero
(74) *Attorney, Agent, or Firm* — Haverstock & Owens LLP

(57) ABSTRACT

According to the present invention there is provided a telecommunications system for providing a facility for communicating internet packet data in accordance with a first internet protocol (IPV6). The system comprises a user equipment, the user equipment including a first internet protocol stack operable in accordance with a first internet protocol (IPV6) and a second internet protocol stack operable in accordance with a second internet protocol (IPV4). The system includes a packet radio system (GPRS) network operable to communicate internet packet data in accordance with the second internet protocol (IPV4), and an inter-working. The inter-working unit is operable in association with the user equipment to represent internet packet data according to the first internet protocol (IPV6) as internet packet data according to the second internet protocol (IPV4) for communication via the packet radio system network (GPRS). The inter-working-unit is operable to represent internet packet data received from the packet radio system network (GPRS) in the form of internet packet data according to the second internet protocol (IPV4) as internet packet data according to the first internet protocol (IPV6) for communication to the user equipment. The inter-working unit acquires from the second internet protocol stack an address for representing the internet packet data according to the first internet protocol as internet packet data according to the second internet protocol. The inter-working unit also acquires from the first internet protocol stack an address for representing the internet packet data according to the second internet protocol as internet packet data according to the first internet protocol. A corresponding inter-working unit is provided for reciprocal communication of internet packet data to and from the packet radio system network (GPRS).

Embodiments of the present invention can provide a facility for a user equipment to run application programs which require the use of internet protocol communications according to one internet protocol using a packet radio system network which has been arranged to communicate internet packet data according to a different internet protocol.

36 Claims, 10 Drawing Sheets

U.S. PATENT DOCUMENTS

| | | | |
|---|---|---|---|
| 7,554,991 B2 * | 6/2009 | Sbida | 370/395.5 |
| 2002/0120749 A1 | 8/2002 | Widegren et al. | 709/227 |
| 2002/0184510 A1 | 12/2002 | Shieh | 713/185 |
| 2002/0194259 A1 | 12/2002 | Flykt et al. | 709/202 |
| 2003/0208582 A1 | 11/2003 | Persson et al. | 709/223 |

FOREIGN PATENT DOCUMENTS

| | | |
|---|---|---|
| WO | WO 03/105436 A1 | 12/2003 |
| WO | WO 2004/064348 A1 | 7/2004 |
| WO | WO 2004/049668 A1 | 10/2004 |
| WO | WO 2005/002171 A1 | 6/2005 |

OTHER PUBLICATIONS

3GPP TS 23.221 V5.9.0 (Mar. 2004). $3^{rd}$ Generation Partnership Project: Technical Specification Group Services and System Aspects: Architectural requirements (Release 5). pp. 1-37.

Network Working Group: Request for Comments: 2529: Category: Standards Track: B. Carpenter IBM, C. Jung. 3Com, Mar. 1999, pp. 2-9.

Network Working Group: Request for Comments: 2765: Category: Standards Track: E. Nordmark, Sun Microsystems, Feb. 2000, pp. 1-23.

R. Steel, C-C Lee and P. Gould, "GSM, cdmaOne and 3G Systems," published by Wiley International ISBN 0 471 491853.

3GPP TS 32.215 V5.5.0 (Dec. 2003), $3^{rd}$ Generation Partnership Project: Technical Specification Group Services and System Aspects: Telecommunication Management: Charging Management: Charging data description for the Packet Switched (PS) domain (Release 5). pp. 1-66.

Wiljakka J: "ipv6 transition solution for 3gpp networks" IPV6 Transition Solution for 3GPP Networks, Jun. 2002, pp. 1-20. XP002258148, IETF, USA paragraphs 02.4!-'04.4!.

Juha Wiljakka, Nokia. Transition to IPv6 in GPRS Apr. 2002, pp. 134-140, IEEE Communications Magazine.

* cited by examiner

TELECOMMUNICATIONS SYSTEM

FIELD OF THE INVENTION

The present invention relates to systems and methods for communicating internet packet data via packet radio networks, such as, for example, networks operating in accordance with the General Packet Radio System (GPRS).

BACKGROUND OF THE INVENTION

A GPRS network can be formed using a mobile radio system as a backbone network, such as, for example, a Global System for Mobiles (GSM) or a Universal Mobile Telecommunications System (UMTS) network. GPRS as developed by the $3^{rd}$ Generation Project Partnership (3GPP) provides support for packet-orientated services and attempts to optimise network and radio resources for packet data communications such as for example Internet Protocol (IP) communications. The GPRS provides a logical architecture which is related to a physical communications architecture of a mobile radio system.

The Internet Engineering Task Force (IETF) is a body, which is responsible for developing internet protocols for facilitating communications via the internet. For example, a well established internet protocol is the internet protocol version 4 (IPv4) which has been developed and standardised for personal computers to access the internet. The IETF has also developed a further standard known as the internet protocol version 6 (IPv6) which provides an improvement with respect to the IPv4 in terms of facilitating mobile communications and increased addressing options for user equipment. Whilst there are similarities between IPv4 and IPv6, a packet radio network which has been developed to support IP4 cannot communicate internet packets according to the IPv6.

SUMMARY OF INVENTION

According to the present invention there is provided a telecommunications system for providing a facility for communicating internet packet data in accordance with a first internet protocol (IPV6) via a packet radio system (GPRS) network which is operable to communicate internet packet data in accordance with a second internet protocol (IPV4). The system includes at least one mobile user equipment and an inter-working unit. The mobile user equipment including a first internet protocol stack operable in accordance with the first internet protocol (IPV6) and a second internet protocol stack operable in accordance with the second internet protocol (IPV4) and is operable to acquire an address according to the second internet protocol from the packet radio system network by sending an Activate Packet Data Protocol Context request message to the packet radio system network and receiving the second internet protocol address from the packet radio system. The system includes a packet radio system (GPRS) network operable to communicate internet packet data in accordance with the second internet protocol (IPV4), and an inter-working. The inter-working unit is operable to perform one of a protocol translation or a tunnelling process to represent internet packet data according to the first internet protocol (IPV6) as internet packet data according to the second internet protocol (IPV4) for communication via the packet radio system network (GPRS). The inter-working unit is operable to represent internet packet data received from the packet radio system network (GPRS) in the form of internet packet data according to the second internet protocol (IPV4) as internet packet data according to the first internet protocol (IPV6) for communication to the user equipment. The inter-working unit acquires from the second internet protocol stack an address for representing the internet packet data according to the first internet protocol as internet packet data according to the second internet protocol. If performing the protocol translation the inter-working unit also acquires from the first internet protocol stack an address for representing the internet packet data according to the second internet protocol as internet packet data according to the first internet protocol for communicating to the mobile user equipment. A corresponding inter-working unit is provided for reciprocal communication of internet packet data to and from the packet radio system network (GPRS).

Embodiments of the present invention can provide a facility for a user equipment to run application programs which require the use of internet protocol communications according to one internet protocol using a packet radio system network which has been arranged to communicate internet packets according to a different internet protocol. The packet radio network may be for example a General Packet Radio System (GPRS) network, and the first internet protocol may be IPV6, whereas the second internet protocol may be IPV4. In one example, an application program may require access to an Internet protocol Multi-media Sub-system (IMS).

The IMS has been developed by the 3GPP to provide a facility for supporting multimedia services and applications for user equipment. According to the 3GPP TS23.221 "Architectural Requirements (Release 5)" [1], the IP Multimedia Subsystem is IPv6 only. This means that IMS control entities such as P-CSCF, S-CSCF (described in Annex 1) are IPv6, requiring that the UMTS Network bearers are IPv6 capable, so that IPv6 packets carrying both signalling and user data are routed through native IPv6 bearers (without conversion to/from IPv4). However, a substantial amount of investment has been made in packet radio networks such as GPRS networks which have been deployed and operate in accordance with the Internet Protocol version 4 (IPV4). As a result, at present, a user equipment cannot use an IMS service when communicating using GPRS networks according to the IPv4.

Embodiments of the present invention can allow a user equipment to run application programs which require the use of internet protocol communications in accordance with a first internet protocol such as the IPv6 via an existing GPRS network operating in accordance with a second internet protocol such as the IPv4 standard. As such user equipment can access an IMS network and enjoy the facilities afforded by an IMS network whilst still using a conventional IPv4 GPRS network. To this end, the user equipment is provided with a first protocol stack operating in accordance with the Ipv6 standard and a second protocol stack operating in accordance with the Ipv4 standard. An inter-working unit is deployed in association with user equipment for sending and receiving internet packets to and from the user equipment. The inter-working unit represents IPv6 internet packets as IPv4 internet packets for communication via an IPv4 bearer provided by a GPRS network. Conversely the inter-working unit receives IPv4 packets from the GPRS network via the IPv4 bearer and represents the IPv4 internet packets as IPv6 internet packets and communicates these to the user equipment.

An example of the function of the inter-working unit is to convert an address of the internet packets according to the first internet protocol (IPv6) into an address according to the second internet protocol (IPv4) to form the internet packets according to the second internet protocol. Correspondingly, the inter-working unit converts an address of internet packet according to the second internet protocol (IPv4) into an address according to the first internet protocol (Ipv6) to form the internet packets according to the first internet protocol (IPv6) the addresses for the first internet protocol and the second internet protocol being provided by the user equipment. The IPv6 address may be provided from the internet protocols stack of the user equipment either in the static form or dynamically. Similarly, the IPv4 address can be provided by IPv4 internet protocol stack either dynamically or statically. For example the IPv4 address may be provided by the GPRS network following a Packet Data Protocol context application request.

In one embodiment the inter-working unit forms a tunnelling processor which is arranged to encapsulate IPv6 internet packets as IPv4 internet packets for communication via the GPRS network and to de-encapsulate IPv6 internet packets received from the GPRS network as IPv4 internet packets. An advantage of using a tunnelling processor is that the inter-working unit can represent IPv6 internet packets as IPv4 packets for communication via the GPRS network and represent IPv4 internet packets as IPv6 internet packets for communication to user equipment relatively simply by encapsulation and de-encapsulation. Furthermore, if the IPv6 and IPv4 addresses of the user equipment are compatible then address conversion can be made automatically. In other embodiments the inter-working unit includes a protocol translator which is arranged to convert IPv6 internet packets into IPv4 packets for communication via the GPRS network and to convert IPv4 internet packets into IPv6 internet packets for communication to user equipment. Although a protocol translator may be more complicated than a tunnelling processor, a protocol translator has an advantage in terms of communication efficiency, particularly with respect to radio communications. This is because an amount of redundant data is reduced with respect to an IPv6 internet packet tunnelled as an IPv4 internet packet because for example only one header is transmitted if an IPv6 packet is translated into an IPv4 packet, rather than tunnelled.

Various further aspects and features of the present invention are defined in the appending claims with supporting embodiments described below.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF THE EXAMPLE EMBODIMENTS

One issue associated with introducing IMS is to reduce the impact of the requirements of IPv6 only on an operator's network infrastructure, which is currently IPv4 only. A risk associated with upgrading an existing IPv4 IP/UMTS network to support IPv6 so as to support IPv6 IMS can be perceived because some features of IPv6 are still being developed and the deployment and engineering practice is less mature than IPv4. In addition, the benefits of deploying IPv6 from a 3 G operator's perspective are not yet clear. IPv4 only network including IPv4 only UMTS networks will remain the only operational platform on a large scale before IPv6 is introduced gradually. A requirement of an IPv6 only IMS presents some restrictions on a 3 G operator's strategy for deploying IMS services. This is because IPv6 IMS services will not be supportable until a UMTS network supports IPv6, i.e. the UMTS session needs to support native IPv6 requiring IPv6 PDP Context operation.

Embodiments described below provide mechanisms for supporting IPv6 traffic (both IMS signalling and user data) across IPv4 only GPRS/UMTS network. A 3 G operator is thereby able to support IPv6 communications using an existing IPv4 only UMTS and thus risks associated with an early introduction of IPv6 IMS are reduced.

Figure 1:
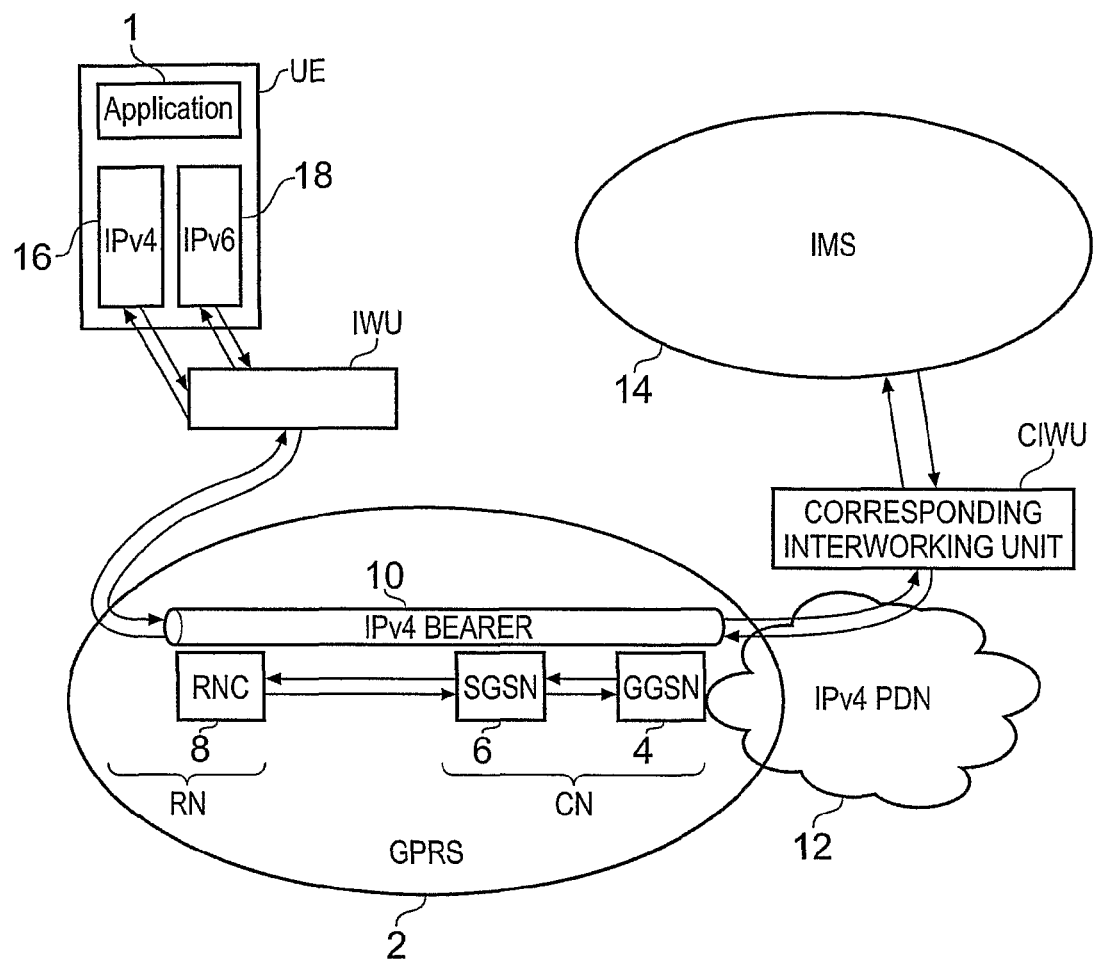
FIG. 1 is a schematic block diagram of a telecommunications system in which a user equipment is communicating via a GPRS network with an Internet Protocol Multi-media Sub-system.

FIG. 1 provides a schematic block diagram of a system for communicating internet packets according to a first (IPv6) internet protocol via a packet radio system network which has been developed to support the communication of internet packets according to a second (IPv4) internet protocol standard. In FIG. 1 a user equipment, UE, is arranged to host an application program 1 providing a multimedia service to a user. The application program 1 requires access to an Internet protocol Multi-media Sub-system (IMS) such as that developed by the 3GPP to provide multimedia services to users using a UMTS backbone network. More information on the 3GPP IMS network is provided in Annex 1.

For the present example the packet radio system network is a General Packet Radio System (GPRS) network 2. A more detailed explanation of the components of GPRS network 2 is provided in Annex 2. However, for simplicity FIG. 1 shows elements of a GPRS network which are a—Gateway GPRS Support Node (GGSN) 4 a serving GRPS support mode (SGSN) 6 and a radio network controller (RNC) 8. Generally the GGSN 4 and the SGSN 6 form parts of a core network, CN, whereas the radio network controller RNC 8 forms part of a radio network RN. As shown in FIG. 1, in a simplified form for the present description, the GPRS network 2 is providing in IPv4 bearer 10 because the GPRS network has been established with the IPv4 internet protocol. As will be explained shortly, an IPv4 bearer is established for the user equipment UE for conveying internet packets via the GPRS network to a correspondent node and for the example of signalling data (SIP messages) an IMS network. The internet packets egress from the GPRS network 2 from the GGSN 4 to a packet data network 12 also operating in accordance with the IPv4 internet protocol.

For the present example, the user equipment UE is running an application program which requires the support of an IMS network. As shown in FIG. 1 an IMS network 12 is shown generally to communicate internet packets via the IPv4 bearer provided by the GPRS network. However, as explained above, IMS has been developed and standardised in accordance with the IPv6 internet protocol standard. In order to provide an arrangement whereby the user equipment UE can send and receive internet packets in accordance with the IPv6 internet protocol via a GPRS network operating in accordance with the IPv4 internet protocol an inter-working unit IWU is provided. In accordance with the present technique the inter-working unit IWU operates to communicate IPv6 internet packets via the IPv4 bearer 10 provided by the GPRS network 2. At a point where the internet packets are received from the packet data network 12 in the form of IPv4 packets, a corresponding inter-working unit, CIWU, is provided to allow internet packets to be communicated with, for example, the IMS network 14 in accordance with the IPv6 internet protocol internet protocol.

As will be explained shortly in one example the inter-working unit, IWU, operates as a tunnelling processor to provide intelligent tunnelling of IPv6 internet packets as IPv4 internet packets to communicate the IPv6 internet packets via the IPv4 bearer. Conversely, the inter-working unit, IWU, receives IPv6 internet packets in the form of IPv4 tunnel packets from the GPRS network 2 and de-encapsulates the packets to recover the IPv6 internet packets. In another example, the inter-working unit IWU forms a protocol translator which is arranged to translate the IPv6 internet packets into IPv4 internet packets. However, in order to effect operation of the inter-working unit IWU then the inter-working unit IWU is arranged to be provided with both an IPv6 address of the UE and an IPv4 address of the UE. This will now be explained.

Address Acquisition

There are four possible combinations of address acquisition by the user equipment UE depending upon whether either the IPv4 or IPv6 internet protocol addresses are acquired statically or dynamically. As illustrated in FIG. 1, the user equipment, UE, is provided with an IPv4 internet protocol stack 16 and an IPv6 internet protocol stack 18. The IPv4 and IPv6 internet protocol stacks operate independently to acquire an address if a dynamic allocation is selected or to provide an address if a static allocation is to be effected. Each type of address is considered in turn as follows:

Acquisition of an IPv4 Address

The IPv4 internet protocol address is acquired by the UE following a Packet Data Protocol context application request as defined in the 3GPP standard TS32.015 [5] and summarized in Annex 3. Generally a PDP context activation procedure as defined in the 3GPP standard provides a facility for obtaining an IPv4 address from the core network part, CN, of the GPRS network 2. To acquire an IPv4 address from the network, in the Activate PDP Context Request message, UE leaves the PDP Context Address field empty. If the GGSN 4 is configured by the operator to have an IP address assigned by an external network, then in its Activate PDP Context Accept Message, GGSN fills the PDP Address field with "0" to indicate to the user equipment UE that it needs to request an IP address assignment from an external network using the established UMTS bearer (such as using DHCP). For a static address assignment the UE fills the PDP address field with its own IPv4 address.

Acquisition of an IPv6 Address

As for the case of the IPv4 address the IPv6 address acquired by the user equipment UE can be either static in which case the address has already been allocated or dynamic. In the case of a dynamic allocation of an IPv6 address, the UE acquires an IPv6 address from a server using DHCPV6 via the IPv4 UMTS bearer (IPv4 PDP context) in order to interact with the DHCPV6 server. Again, if the IPv6 address has been statically allocated then the user equipment UE will already have an IPv6 address which it can use to communicate IPv6 internet protocol packets.

The IPv6/IPv4 Address Management

Although the UE can acquire the IPv6 and IPv4 addresses as described above, two types of IPv6 address can be provided to the user equipment UE. The IPv6 address can be an IPv4 compatible address in which case the IPv6 address bears the higher order 96 bit preference 0:0:0:0:0:0 and an IPv4 address in a lower order 32 bits. As will be explained shortly, if the IPv6 address is IPv4 compatible then the inter-working unit, IWU, acting as a tunnelling processor can perform automatic tunnelling. For the above cases of address assignment, the user equipment UE does not explicitly acquire an IPv6 address and uses the IPv4 address (static or dynamic) as the lower order 32 bits. Alternatively, if the IPv6 address is a native address in that the IPv6 address is independent from the IPv4 address, then the remainder of the IPv6 address space bears a prefix other than 0:0:0:0:0:0, which will be the case for a dynamic address assignment.

Operation of the Inter-working Unit

Figure 2:
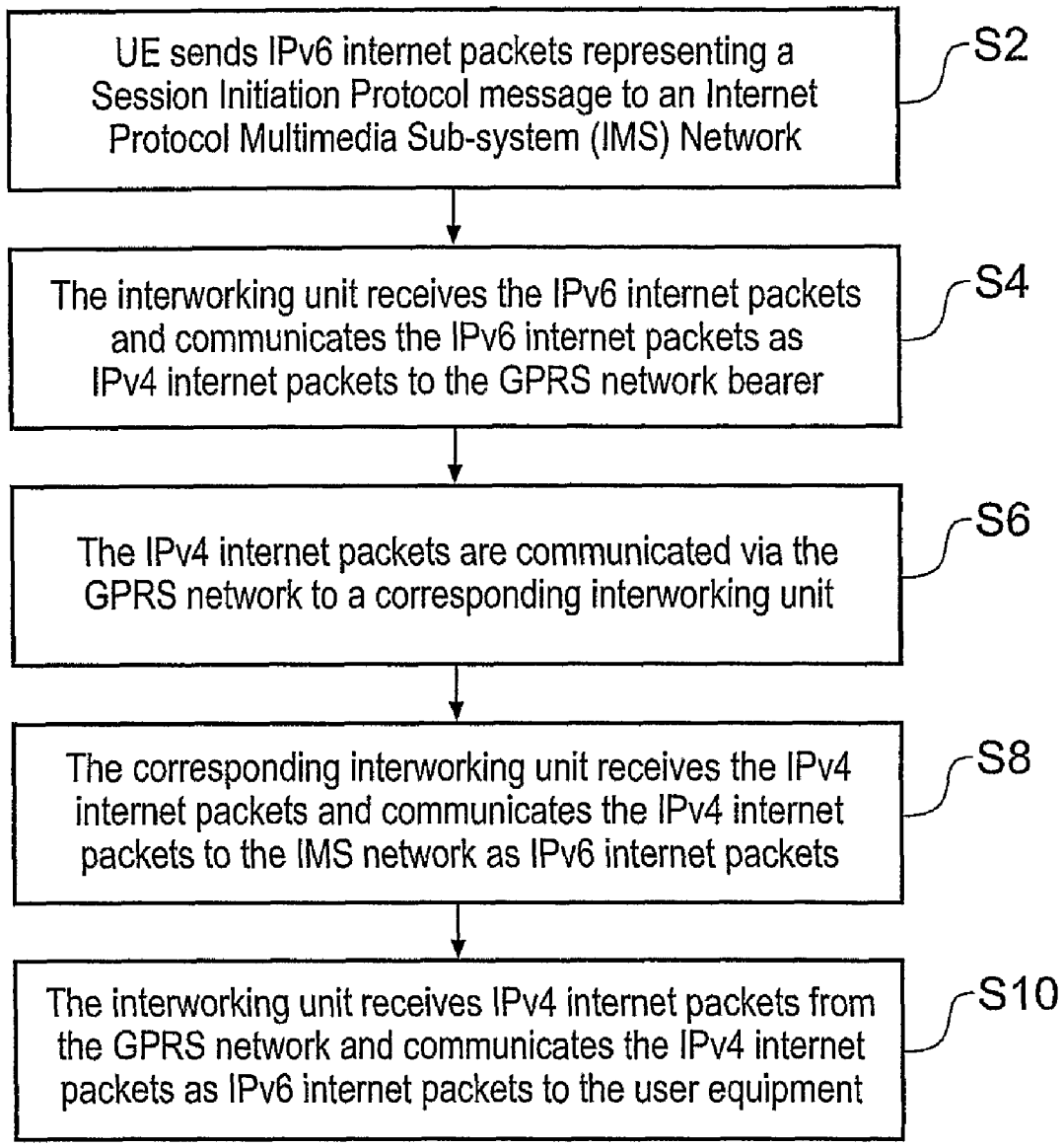
FIG. 2 is a flow diagram representing the operation of an inter-working unit which appears in FIG. 1.

A more detailed explanation of the operation of the inter-working unit is provided either as for example a tunnelling processor or a protocol translator will be described shortly. However FIG. 2 represents a general operation of the inter-working unit IWU when communicating IPv6 internet packets from the UE to the IMS. FIG. 2 is summarized as follows:

S1: The user equipment UE sends an IPv6 internet packet representing for example a session initiation protocol (SIP) message to an IMS network as part of a communications session.

S4: The inter-working unit IWU receives the IPv6 internet packet and communicates the IPv6 internet packet as an IPv4 internet packet to the GPRS network. The inter-working unit IWU represents the IPv6 internet packet as an IPv4 internet packet but includes all the data carried by the IPv6 internet packet.

S6: The IPv4 internet packets are communicated via the GPRS network and possibly a packet data network 12 to a corresponding internet working CIWU associated with the IMS network 14.

S8: The corresponding inter-working unit receives the IPv4 internet packet and communicates the IPv4 packets in the form of IPv6 internet packet to the IMS network. The corresponding inter-working unit CIWU performs a reciprocal function in that the IPv6 internet packets are recovered from the IPv4 internet packets and then communicated to the IMS network.

S10: The inter-working unit IWU correspondingly receives IPv4 internet packets from the GPRS network communicated via the IPv4 bearer 10 and represents the IPv4 internet packets as IPv6 internet packets by recovering the IPv6 internet packets from the IPv4 internet packets. The IPv6 internet packets are then communicated to the user equipment UE.

Figure 3:
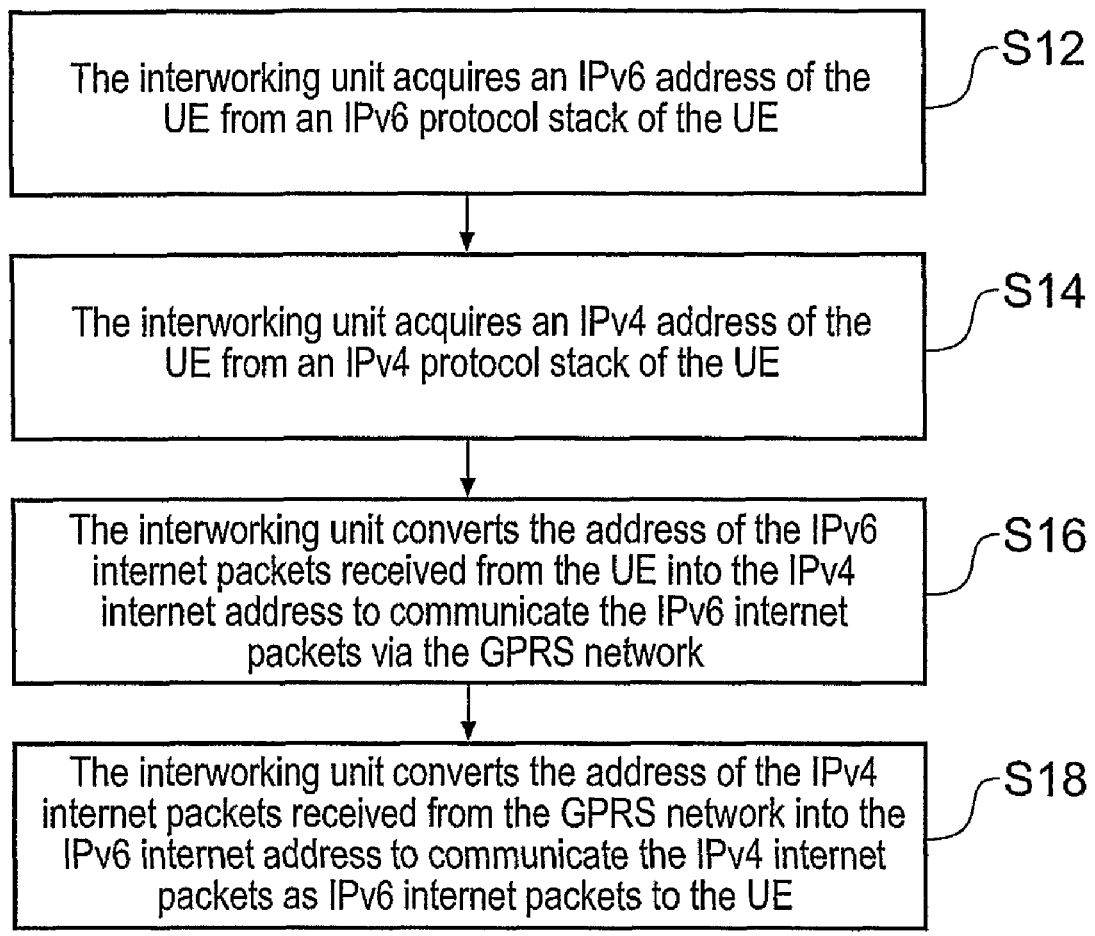
FIG. 3 is a flow diagram representing the operation of an inter-working unit which appears in FIG. 1, when acquiring IPV4 and IPV6 addresses from the user equipment.

In order to represent the IPv6 internet packets as IPv4 internet packets the inter-working unit must acquire the IPv4 address and the IPv6 address of the user equipment UE. A process whereby the inter-working unit IWU acquires the IPv6 and IPv4 addresses of the user equipment UE is represented in FIG. 3. FIG. 3 is summarized as follows:

S12: The inter-working unit IWU acquires an IPv6 address of the user equipment UE from an IPv6 protocol stack of the user equipment UE. As explained above, the IPv6 address may be acquired by the protocol stack either dynamically or statically.

S14: The inter-working unit IWU then also acquires the IPv4 address of the user equipment UE from an IPv4 protocol stack of the UE. Again as is explained above, the IPv4 address may be allocated from a PDP context activation in which the address is assigned dynamically by the GPRS network.

S16: The inter-working unit IWU converts the IPv6 internet packets received from user equipment into the IPv4 packets to communicate the IPv6 packets via the GPRS network using the IPv4 bearer.

S18: The inter-working unit IWU also converts the IPv4 internet packets received from the GPRS network bearer 10 into the IPv6-packets to communicate the IPv4 internet packets as IPv6 internet packets to the user equipment UE. Conversion will depend upon whether the inter-working unit IWU operates as a protocol translator or as a tunnelling processor. If the inter-working unit IWU operates as a tunnelling processor then the inter-working unit will simply add or strip off the IPv6 header when encapsulating IPv6 packets and recover the IPv6 packet from an IPv4 packet received from the GPRS network bearer.

Inter-working Unit as a Tunnelling Processor

As mentioned above, one implementation of the inter-working unit IWU is as a tunnelling processor. According to the present technique a tunnelling processor can operate in an intelligent way to tunnel IPv6 packets as IPv4 packets depending upon the type of address and compatibility of the IPv4 and IPv6 addresses. A tunnel processor is associated with both the user equipment UE and the entry point of the IMS subsystem which may be the first router that supports IPv6. This could be the P-CSCF/S-CSCF. The function of the tunnelling processor broker is:

To determine the address type of the user equipment UE (IPv4 compatible or IPv6 native);
To select the tunnelling type based the address type;
To tunnel the IPV6 traffic and signalling over IPV4 bearer established by a PDP context activation;
To de-encapsulate IPV6 internet packets from IPV4 internet packets.

The tunnelling processor may operate on IPV6 IMS traffic or signalling. For IPv6 IMS signalling over the IPv4 UMTS bearer, the tunnelling processor sends IMS signalling (SIP/SDP messages) to IMS system elements (P-CSCF/S-CSCF). Both the tunnelling processor and the corresponding tunnelling processor (the IPv6 UE and the IPv6 IMS) run native IPv6 while the intermediate bearers including the UMTS are IPv4 only.

The tunnelling processor can perform the following tunnelling techniques (as specified in RFC 2893[2]):

IPv6-over-IPv4 tunnelling, which involves encapsulating IPv6 packets within IPv4 so that they can be carried across IPv4 routing infrastructure.

Configured tunnelling which involves encapsulating IPv6 over IPv4 packets but the IPv4 tunnel endpoint address is determined by configuration information on the encapsulating node.

Automatic tunnelling which involves IPv6-over-IPv4 tunnelling where the IPv4 tunnel endpoints address is determined from the IPv4 address embedded in the IPv4 compatible destination address of the IPv6 packet being tunnelled.

IPv4 Multicast tunnelling which involves IPv6-over-IPv4 tunnelling where the IPv4 tunnel endpoint address is determined using Neighbour Discovery. Unlike configured tunnelling it does not acquire any address configuration and unlike automatic tunnelling it does not require the use of IPv4-compatible addresses.

Figure 4:
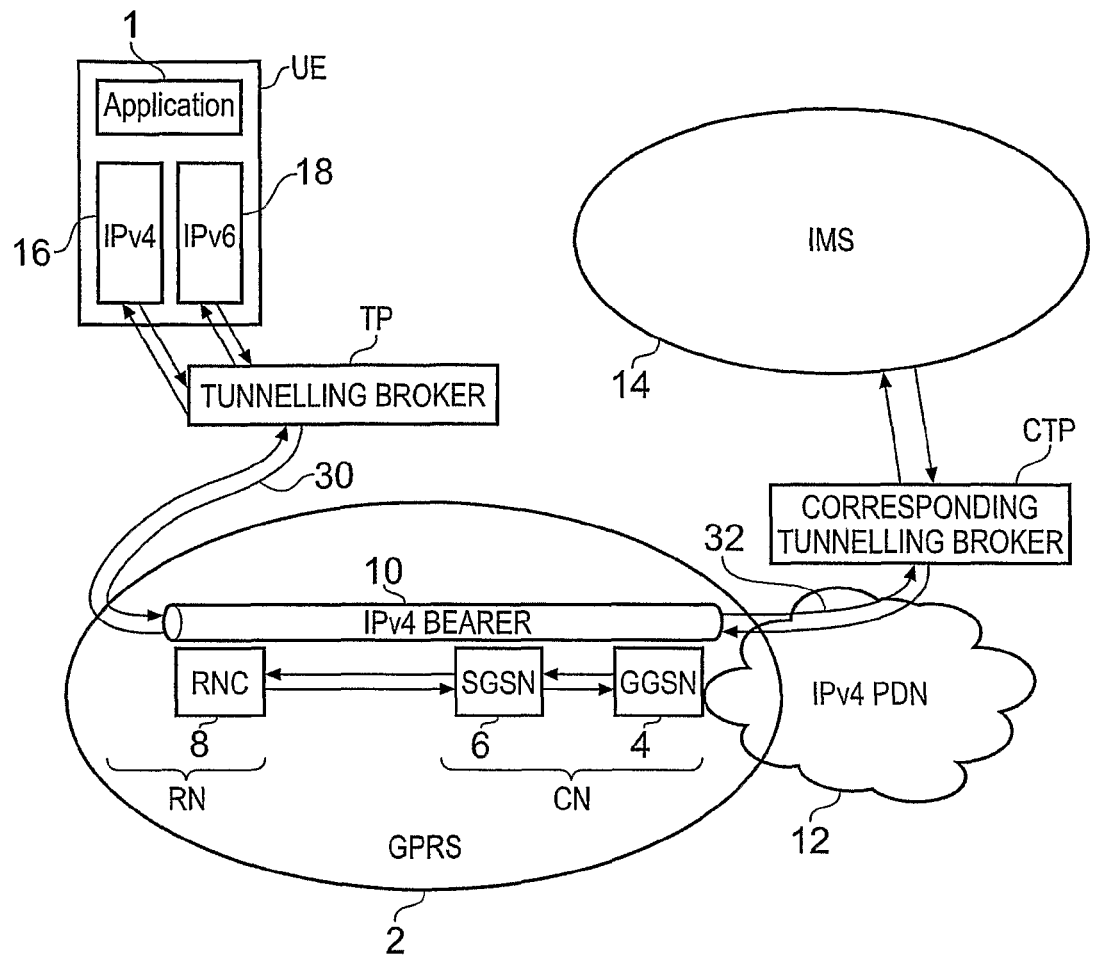
FIG. 4 is a schematic block diagram of a telecommunications system appearing in FIG. 1, in which the inter-working unit is operating as a tunnelling processor.

The inter-working unit IWU operating as a tunnelling processor is illustrated in a schematic block diagram shown FIG. 4 which corresponds to the diagram in FIG. 1 already described above in which like parts have the same numerical reference numerals. As shown in FIG. 4 the inter-working unit IWU is now labelled as a tunnelling processor TP and the corresponding inter-working unit is now a corresponding tunnelling processor CTP. For the diagram shown in FIG. 4 the tunnelling processor tunnels the IPv6 packets as IPv4 packets via the IPv4 bearer as illustrated by arrows 30, 32. The tunnelling processor TP therefore operates to encapsulate the IPv6 packets received from the user equipment UE as IPv4 packets for communication via the IPv4 bearer 10. Correspondingly, de-encapsulation requires receiving the IPv4 packets from the IPv4 bearer and recovering the IPv6 internet packets for communication to the user equipment UE. De-encapsulation for example is illustrated in FIG. 5.

Figure 5:
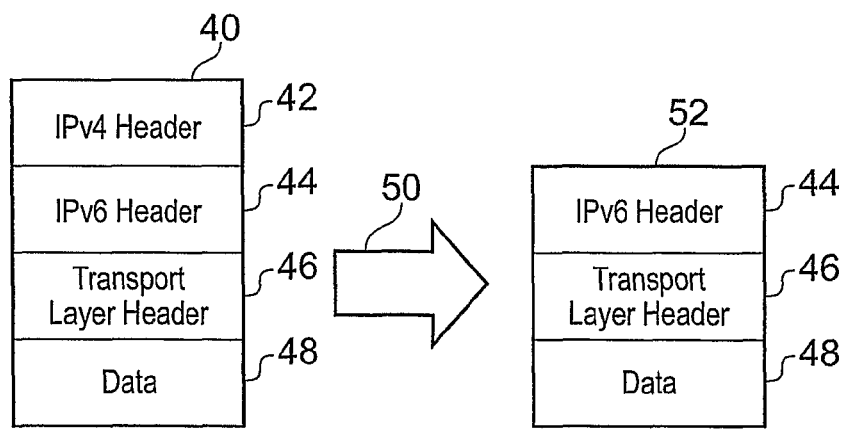
FIG. 5 is a schematic block diagram illustrating an IPV6 packet encapsulated as an IPV4 packet and a de-encapsulated IPV6 internet packet.

In FIG. 5 an encapsulated IPv6 packet which has been encapsulated as an IPv4 packet 40 has been received from the GPRS network 2. The IPv4 packet includes an IPv4 header 42, an IPv6 header 44, a transport layer header 46 and payload data 48. As represented by an arrow 50 de-encapsulation is performed to produce the IPv6 internet packet 52. As illustrated the IPv6 internet packet includes the IPv6 header 44, a transport layer header 46 and the data 48. As illustrated by FIG. 5 the IPv4 packet 40 is communicated via a radio access interface provided by the radio network part RN of the GPRS network 2 and includes redundant information in the IPv6 header 44 and the transport header 46. Therefore as shown for the IPv4 packet 40 three headers are communicated which are the IPv4 header 42, the IPv6 header 44 and the transport header 46. As such one disadvantage of using a tunnelling processor is that a relatively large amount of data is communicated with the payload data 48. This therefore represents an inefficient use of the resources of the GPRS network and since these resources are limited, communication of the IPv6 packet in accordance with a tunnelling processor, is not as efficient as for example a protocol translator. However, the tunnelling processor provides an established and simpler technique for communicating the IPv6 packets as IPv4 packets.

As explained above, the IPv4 bearer has been established on the GPRS network in order to convey the IPv4 packets. According to the GPRS standard the transport data unit as communicated via the GPRS network is in the form of a General Tunnelling Protocol (GTP) unit as specified in accordance with the PDP context activation for an IPv4 packet. An example of a GTP unit is illustrated in FIG. 6.

Figure 6:
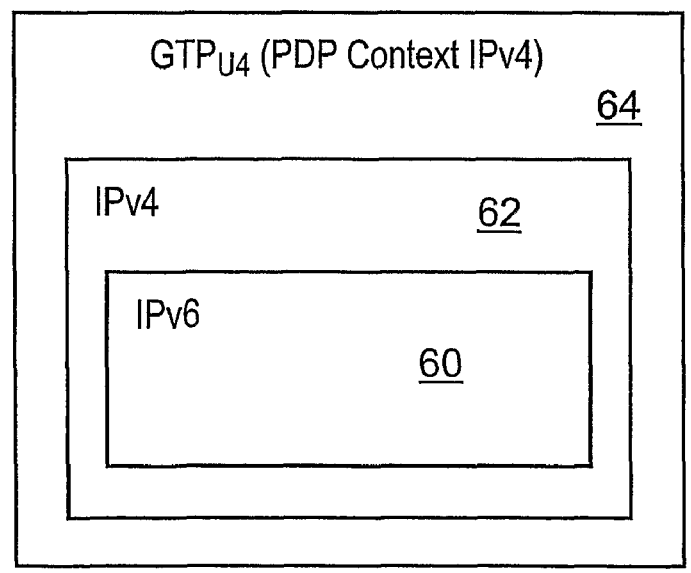
FIG. 6 is a schematic block diagram of a GPRS Tunnelling Protocol unit.

In FIG. 6 the IPv6 packet 60 is shown to be within the IPv4 packet 62 since the IPv6 packet 60 has been encapsulated during the tunnelling process. Correspondingly, the GTP unit 64 encapsulates the IPv4 packet 62. Therefore the present technique provides a facility for conveying an IPv6 packet in a GTP unit generated in accordance with an IPv4 packet for communication across a GPRS network.

Figure 7:
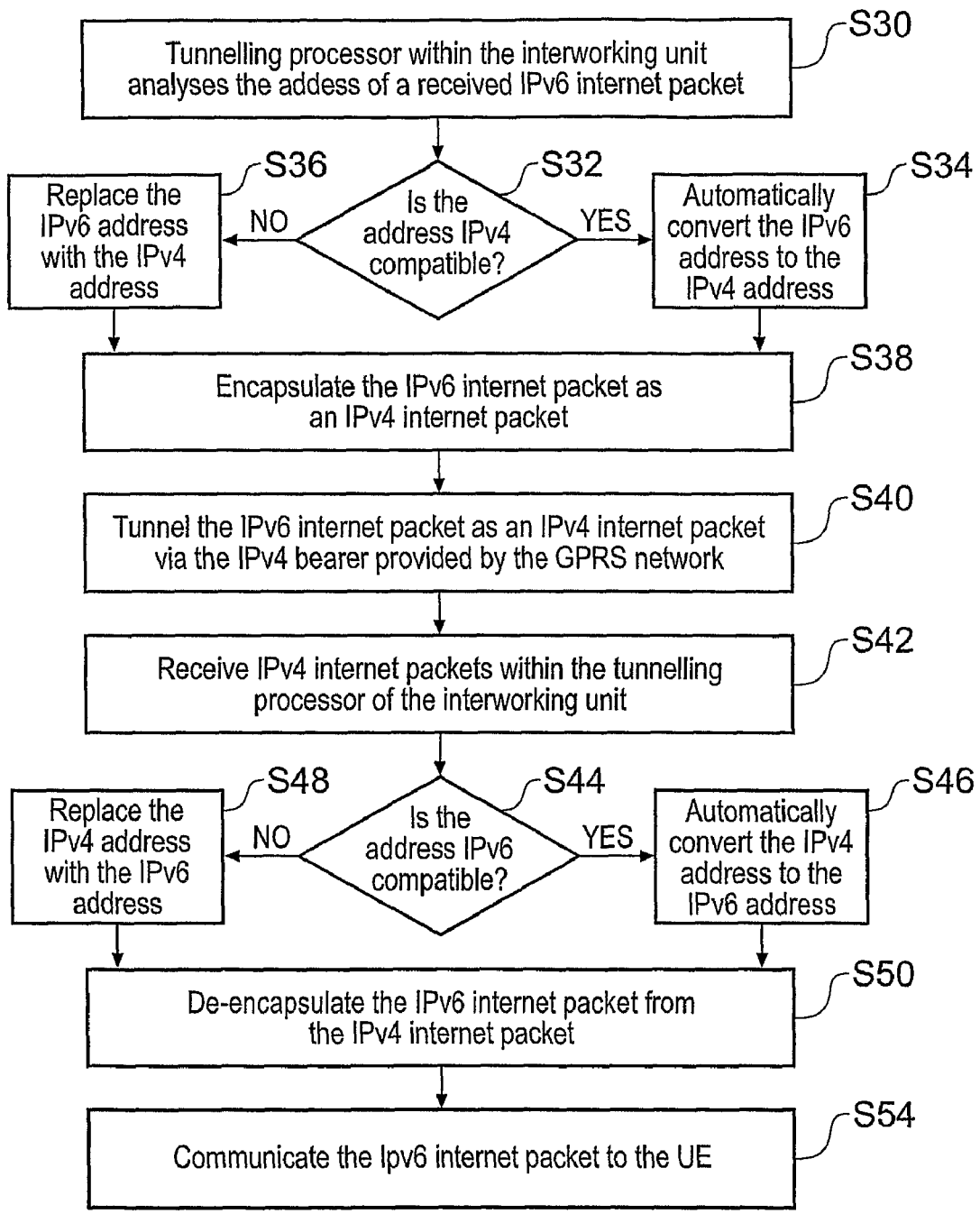
FIG. 7 is a flow diagram representing the operation of the tunnelling processor shown in FIG. 4.

The operation of the tunnelling processor illustrated in FIG. 4 is represented by the flow diagram in FIG. 7. The process steps performed in FIG. 7 according to the operation of the tunnelling processor are summarized as follows:

S30: The tunnelling processor TP analyses the address of a received IPv6 internet packet. As explained above the IPv6 and IPv4 addresses may be compatible. If the addresses are compatible then the tunnelling processor may automatically convert the IPv6 address into an IPv4 address.

S32: The tunnelling processor TP determines whether the IPv6 address is IPv4 compatible.

S34: If the IPv6 address is IPv4 compatible then the tunnelling processor TP automatically converts the IPv6 address into an IPv4 address.

S36: If the IPv6 address is not IPv4 compatible but for example is a native address then the tunnelling processor creates a header from the IPv4 address of the user equipment UE.

S38: The tunnelling processor TP encapsulates the IPv6 internet packet as an IPv4 internet packet.

S40: The tunnelling processor TP tunnels the IPv6 internet packet as an IPv4 internet packet via the IPv4 bearer provided by the GPRS network.

S42: The IPv4 internet packet is received at the corresponding tunnelling processor CTP and the IPv6 packet is recovered by the de-encapsulating the IPv6 packet from the IPv4 packet before it is forwarded to the IMS network 14.

For IPv6 internet packets encapsulated as IPv4 internet packets which are received from the GPRS network at the tunnelling processor TP the following steps are performed:

S42: The IPv4 internet packets are received at the tunnelling processor of the inter-working unit.

S44: The tunnelling processor TP then determines whether the IPv4 address is IPv6 compatible.

S46: If the IPv4 address is compatible with the IPV6 address then the tunnelling processor automatically converts the IPv4 address into the IPv6 address.

S48: If the IPv6 address is not IPv4 compatible then the tunnelling processor TP generates an IPv6 header from the IPv6 address of the user equipment UE.

S50: The tunnelling processor TP de-encapsulates the IPv6 internet packet from the IPv4 internet packet received from the GPRS network.

S54: The tunnelling processor TP then communicates the IPv6 internet packet to the user equipment.

Inter-Working Unit as a Protocol Translator

As for the inter-working unit operating as a tunnelling processor, the inter-working unit operating as a protocol translator is associated with the user equipment UE and a corresponding protocol translator is associated with an entry point of the IMS subsystem. For example the corresponding protocol translator may be located at the first router that supports IPv6, which could be the P-CSCF/S-CSCF.

The function of the protocol translator is:

For UL direction, to convert IPv6 header to IPv4 header at the UE and to recover IPv6 header from IPv4 header at the entry point of the IMS.

Figure 8:
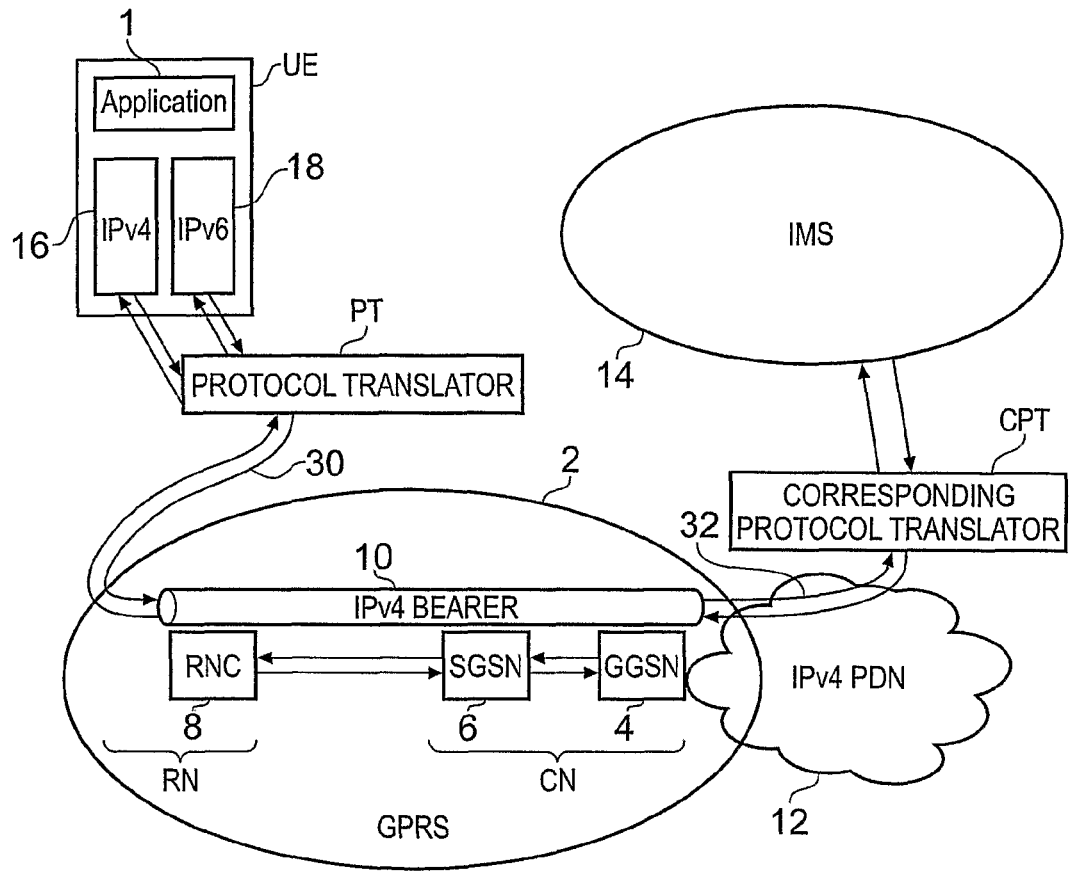
FIG. 8 is a schematic block diagram of a telecommunications system appearing in FIG. 1, in which the inter-working unit is operating as a protocol translator.
Figure 9:
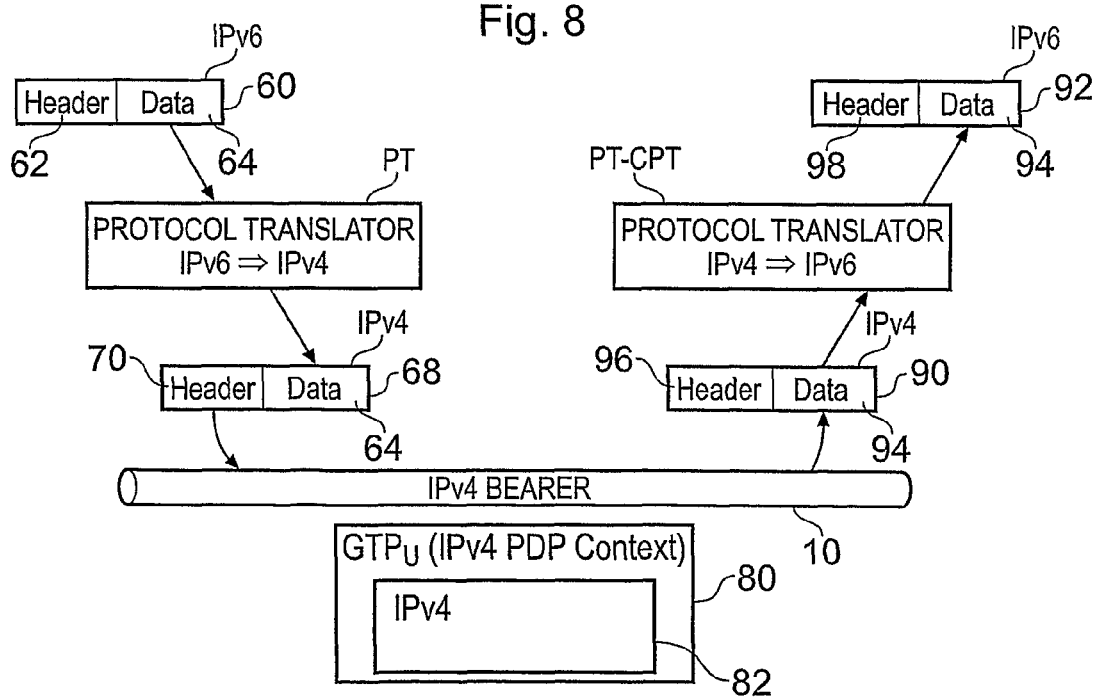
FIG. 9 is a part schematic part flow diagram illustrating the operation of the protocol translator shown in FIG. 8.

For DL direction, to convert the IPv6 header to IPv4 header at the IMS entry point and to recover IPv6 header at the UE FIG. 8 provides an illustration of the system shown in FIG. 1 in which the inter-working unit acts as a protocol translator PT. Parts appearing in FIG. 8 which also appear in FIG. 1 have the same numerical references and only the differences with respect to FIG. 1 will be explained for simplicity and to avoid repetition. Essentially as shown in FIG. 8 the inter-working unit acts as a protocol translator PT and the corresponding inter-working unit is a corresponding protocol translator CPT. FIG. 9 provides an illustrative flow diagram of a process through which the IPv6 internet packets are translated by the protocol translator into IPv4 packets and IPv4 packets are translated into IPv6 packets. As shown in FIG. 9 an IPv6 packet 60 which includes an IPv6 header 62 and a data field 64 is communicated from the user equipment to the protocol translator PT. The protocol translator PT then translates the IPv6 packet into an IPv4 packet by converting respective fields from the header including for example the address into a corresponding IPv4 address to form an IPv4 packet 68 comprising the data of the IPv6 packet 64 and an IPv4 header 70. The IPv4 packet 68 can then be communicated via the IPv4 bearer 10 of the GPRS network. However in contrast to the GTP unit shown in FIG. 6, the GTP unit 80 shown in FIG. 9 only includes as payload data the IPv4 packet 82. Accordingly, it will be appreciated that communication of the IPv4 packet using the protocol translator via the GPRS network is more efficient because less redundant information is communicated.

FIG. 9 shows an IPv4 packet 90 being recovered from the IPv4 bearer 10 of the GPRS network 2. FIG. 9 provides an illustration of a reverse operation performed by the protocol translator in converting an IPv4 packet into an IPv6 packet. This operation is also performed by the corresponding protocol translator CTP. The IPv4 packet is received in the protocol translator PT and converted into an IPv6 packet 92 by copying the payload data 94 and converting the IPv4 header into an IPv6 header 98. One example protocol translation mechanism is the NAT-PT (Network Address Translation/Protocol Translator) which is described in more detail in [3]((RFC2766 using SIIT(RFC 2765)).

IPv6 IMS SBLP Control Over IPv4 UMTS Bearer

The GPRS network provides a function to control access of the resources of the GPRS network in order to avoid a user from using services which have not been authorised. Enforcement of an operator's policy in accordance with an authorisation of a user to use a service is provided by a service based local policy control function. As explained above embodiments of the present invention provide a facility whereby an application program can communicate IPV6 packets on an IPv4 bearer provided by a GPRS network. The application program is therefore able to provide a service to a user, which requires for example the use of an IMS network and therefore requires a facility for communicating using IPv6 packets. However, the service based local policy (SBLP) which authorises an IPv6 IMS session to be enforced by the GGSN of the GPRS network will be established with the respect to an IPv6 bearer and will not be understood by IPv4 GPRS Network, specifically, by IPv4 GGSN. In order to provide a facility whereby a policy for resources allocated for an IPv6 communication session can be enforced with respect to an IPv4 bearer, embodiments of the present invention provide a service based local policy translator (SBLP-T) in combination with policy control function (PCF). The SBLP-T translates the IPv6 authorisation parameters into IPv4 parameters for enforcement by an SBLP enforcer within the GGSN of a GPRS network. As such, service-based local policy control is performed between the PCF as a policy decision point and the SBLP enforcer in the GGSN as a policy enforcement point. The SBLP can therefore block un-authorised resource or service access to prevent, for example, the IMS from attacks such as denial of service and theft of services.

To enforce the policy decision on the "authorised resource limit", the SBLP enforcer at the GGSN performs a "gating" function that operates on a unidirectional flow of IP packets. The SBLP enforcer sets up a "gate" for an authorised IP flow. The gate consists of a packet classifier and a traffic metering function. If an IP packet is found to match the classifier and uses the resources within the authorised limit, the gate is enabled and sent across the GGSN into the UMTS network or out to the external packet data network. The packet delivery will be subject to the QoS control such as DiffServ on the ingress and egress interfaces in the GGSN. For an IP flow which requests resources beyond the authorised limit, the gate is disabled and subsequently the packets are discarded by the GGSN.

Example Arrangement of the SBLP-T and the PCF

Figure 10:
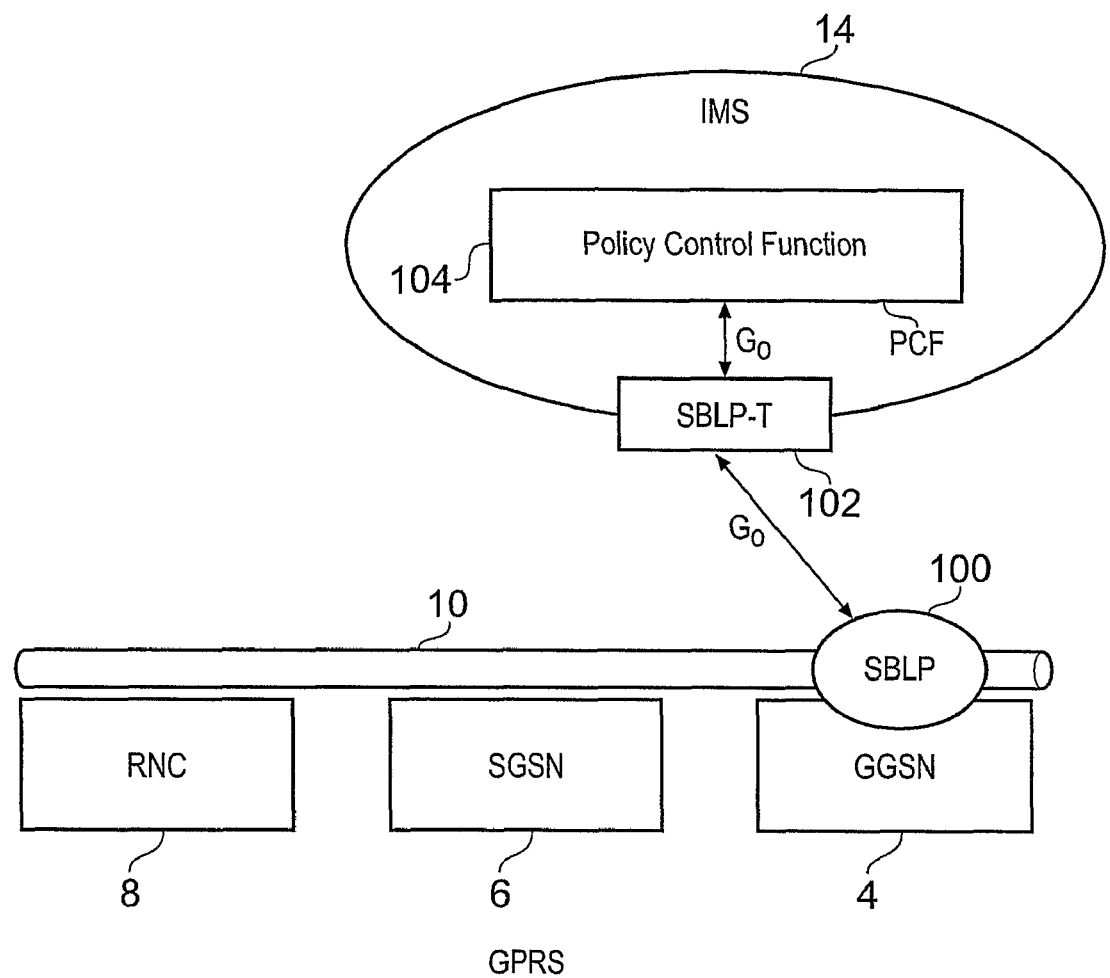
FIG. 10 is a schematic block diagram illustrating part of the system of FIG. 1 but also includes parts associated with a Service-Based Local Policy enforcement.

An example arrangement of an SBLP-T and a PCF with respect to a GPRS network is shown in FIG. 10, parts also appearing in FIG. 1 having the same numerical references. As shown in FIG. 10 the GPRS network in correspondence with the network shown in FIG. 1 includes a GGSN 4, a SGSN 6 and RNC 8. The UMTS bearer provided by the GPRS network 10 is also illustrated and as for the example shown in FIG. 1 is communicating IPv4 packets. Also shown in FIG. 10 is a service based local policy (SBLP) enforcer 100 which is acting as a gate to allow ingress or egress of IPv4 packets from the IPv4 bearer 10. The SBLP enforcer 100 is enforcing a policy for allowing ingress or egress of IPv4 packets according to parameters established by the operator in accordance with a service for which a user has subscribed. The SBLP enforcer receives IPv4 authorisation information from a SBLP-T 102 which is arranged in operative association with the IMS network 40. Within the IMS network 40 there is shown a policy control function (PCF) 104. The PCF includes authorisation information established for an IPv6 communication session.

In operation the SBLP T 102 receives the IPv6 authorisation information and translates the authorisation information into IPv4 authorisation information and communicates this information to the SBLP enforcer 100 to enforce the policy as IPv4 parameters. One example of forming the authorisation information and translating this information for enforcement by the SBLP enforcer 100 will be explained for a Session Initiation Protocol (SIP) message. Upon receiving an IP Multimedia session initiation request, such as, for example an SIP INVITE message, the P-CSCF checks the SIP message for such things as end-points IP address, port numbers and bandwidth requirements. The P-CSCF then authorises the request if this information complies with the operator's IMS service provisioning policy. Then the P-CSCF sends the following policy authorisation information to the PCF:

Destination IP address;
Destination port number;
Transport Protocol id;
Media direction information;
Direction of the source (originating or terminating side);
Indication of the group that the media component belongs to;
Media type information;

The PCF stores the authorisation information, and generates an identifier providing an authorisation for an IMS session, which will be referred to as an authorisation token. The authorisation token is passed back to the P-CSCF for inclusion in the SIP signalling back to the user equipment UE.

According to the existing UMTS specifications, when the GGSN receives UMTS bearer set-up request (IPv6 PDP Context Request Message), the GGSN sends a bearer authorisation request to the PCF. Then the PCF authorises the request according to the stored service based local policy information for the session identified by binding information in the request. The binding information represents an association between the user equipment's UMTS bearer request and the IMS session authorised by the P-CSCF. The binding information includes such things as the number of media components allowed to be multiplexed on the PDP context for the UMTS bearer in question. Upon successful verification of the authenticity of the "binding", the PCF sends authorisation details to instruct the SBLP enforcer in the GGSN to perform the so-called "gating" function. The authorisation information is exchanged between PCF and the GGSN through the Go interface as shown in FIG. 10.

The authorisation information includes the "Authorised QoS" and the packet classifier(s) of the associated IP flows. These are defined as follows:

Packet classifier(s): The PCF shall use the destination IP address(es), destination port number(s) and transport protocol id(s) to formulate a packet classifier(s).

"Authorized QoS": The "Authorised QoS" information (consisting of maximum DiffServ Class and Data Rate) for a media component is extracted from the media type information and bandwidth parameter of the SDP. The PCF maps the media type information into a DiffServ Class which is the highest class that can be used for the media. As an example, the audio media type shall be mapped into Expedited Forwarding (EF).

This authorisation information is used by the SBLP enforcer in the GGSN to perform the gating function. The SBLP enforcer checks if any incoming packet at the GGSN complies with these authorisation rules. If not the packet will be blocked.

The authorisation information listed above is IP version specific, in other words the authorisation information is specific to IPv6. For example, the source and destination addresses are IPv6 addresses of the peer user equipment UE. The DiffServ Code Point (DSCP) is carried in the Traffic Class Object field in Ipv6 packets. For IPv4 UMTS network, the IPv6 specific authorisation details are not understood by the IPv4 GGSN. This is because the GGSN cannot interpret the IPv6 source and destination address and the traffic Class object type for the DiffServ QoS Class—DSCP. For this reason, the SBLP-T is provided to interpret the authorisation information between GGSN and the PCF. The SBLP-T translates a IPv4 GGSN authorisation request into an IPv6 format and translates the IPv6 authorisation information from PCF to an IPv4 format. The SBLP enforcer in the GGSN can therefore perform the gating function on the IPv4 packets (either IPv4 piggybacking IPv6 (the tunnel) or the IPv4 converted from IPv6 (the protocol translation)).

SBLP-T Address Acquisition

To translate the IPv6 specific SBLP authorisation information into the IPv4 format there must be the IPv4 equivalent authorisation information such as an IPv4 packet classifier and an IPv4 QoS format for DiffSev. In order to perform the translation, the SBLP-T must know the IPv4 source and destination addresses. As already explained the user equipment UE is IPv6 and IPv4 dual stack and has an IPv4 address, which as already explained will be either statically or dynamically allocated during the PDP Context activation. SBLP-T is informed of the IPv6 source/destination addresses by the PCF after receiving the authorisation policy information from the P-CSCF. However, the original definition of authorisation policy information does not contain the source address. According to the present technique the authorisation information is therefore expanded to contain the IPV4 source address of the user equipment. SBLP-T is informed of the IPv4 address of the local user equipment UE (the IPv4 source address), by the GGSN which assigned the address during the IPv4 PDP Context Activation. For a static IPV4 address, the GGSN acquires the user equipment's IPv4 address from the Activate PDP Context message via the Protocol Configuration Option (PCO) field.

To acquire the IPv4 address of the peer (remote) user equipment, (IPv4 destination address), two solutions are possible:

PCF based: The local SBLP-T is informed by the PCF of the IPv4 address of the peer IPv6 UE. This will require the P-CSCF to send to the PCF the authorisation information containing both the IPv6 destination and source addresses and the IPv4 destination and source addresses. P-CSCF can acquire the IPv4 address of the peer (remote) user equipment UE in a similar way as it acquires its IPv6 address e.g. through DNS (Domain Name Server). Alternatively, P-CSCF can acquire the IPv4 address of the remote peer UE during its interaction with its peer S-CSCF which acquires the address from its peer S-CSCF that serves the remote UE.

SBLP-T based: The local SBLP-T communicates with the SBLP-T at the other end where the peer user equipment UE is located to exchange the IPv4 address of each UE. In this case, the SBLP-T must acquire the IPv4 address of its local user equipment UE by arranging for the user equipment UE to pass its IPv4 address (its unique association with its IPv6 address for security purpose) using a Protocol Configuration Option Field in the PDP context control messages.

IPv4 QoS Authorisation Translation

One difference between the IPv6 QoS and the IPv4 QoS in this context is that the DSCP is carried in the Traffic Class Object field in the IPv6 header whilst for IPV4 this is carried in the Type of Service (ToS) IPv4 header. SBLP-T is responsible for translating the Type of Service (ToS) Type for the DiffServ QoS Classes into Traffic Class Type and vice versa.

Summary of Operation of the SBLP-T and the PCF

Figure 11:
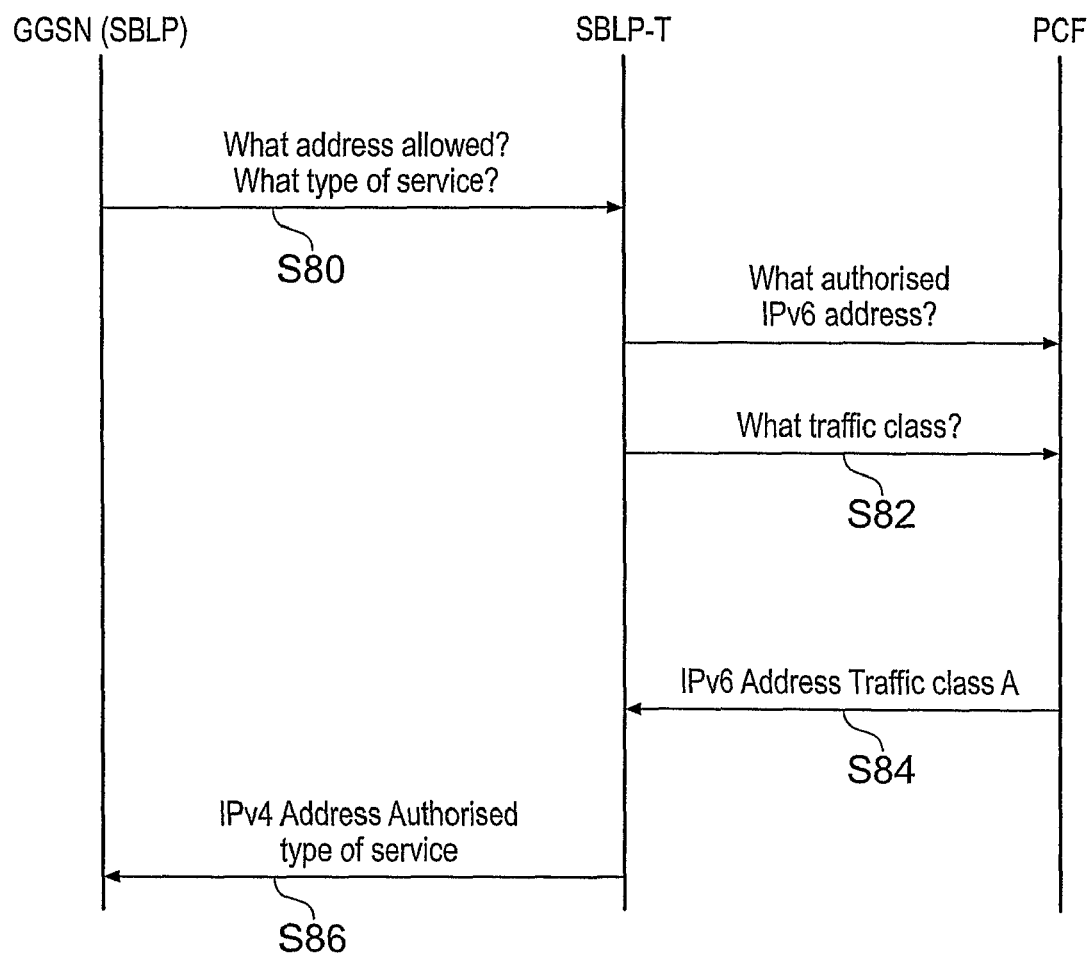
FIG. 11 is a flow diagram illustrating the operation of the parts of FIG. 10 associated with Service-Based Local Policy enforcement.

To summarise the above explanation of the operation of the SBLP enforcer, the SBLP-T and the PCF in providing a service-based policy control function, a flow diagram is provided in FIG. 11 illustrating a more generalised operation for enforcing service based policy parameters. As explained above, examples of parameters which are required by the SBLP enforcer are the IPv4 source and destination addresses which IPv4 packets may be allowed during a communication session and an authorised type of service. However, the information held by the PCF for the communication session will be in the form of an IPv6 source and destination addresses. In combination with the addresses a traffic class is required which for the IPv6 standard defines the type of traffic which can be allowed during a session and can be considered as equivalent to the type of service in IPv4. Therefore, in order to express the IPv6 authorisation information as IPv4 information the SBLP-T translates the IPv6 address into IPv4 addresses and translates the traffic class into a service class. This example is illustrated in the flow diagram of FIG. 11. FIG. 11 is summarized as follows;

S80: The SBLP enforcer 100 interrogates the SBLP-T for authorised parameters for allowing ingress and egress of IPv4 packets. The SBLP enforcer 100 presents these questions as "what address is allowed?" and "what type of service is allowed?". These questions are therefore in the form of IPv4 parameters. The SBLP-T 102 receives the questions from the SBLP enforcer 100 and converts these questions into IPv6 parameters. Thus the question "what address is allowed?" becomes "what authorised IPv6 address is allowed?" and the question "what type of service is allowed?" becomes "what traffic class is allowed?".

S84: The PCF 104 responds to the question from the SBLP T with IPv6 addresses which are allowed and a traffic class which is allowed.

S86: The SBLP-T 102 then translates the IPv6 authorisation parameters into IPv4 parameters so that the parameters are the IPv4 addresses which are allowed and an authorised type of service which is allowed.

Various further aspects and features of the present invention are defined in the appended claims. Various modifications can be made to the embodiments herein described without departing from the scope of the present invention. For example, although the above embodiments have been described for a first internet protocol as IPV6 and the second internet protocol (communication via the packet radio system network) as IPV4, in other embodiments the first protocol may be IPV4 and the second protocol (for communication via the packet radio system network) may be IPV6. Furthermore other internet protocols may be used for the first and second internet protocols.

Annex 1: IP Multimedia Subsystem

The third generation partnership project known as 3GPP has developed and standardised an Internet Protocol Multimedia Sub-system (IMS) to provide a multi-media and call control service architecture. The service architecture is supported by a real-time capable Universal Mobile Telecommunications System (UMTS) communicating data in the form of Internet Protocol (IP) packets. IMS provides a basis for service provision and development of new services and is envisioned as a standardised convergence platform, which enables integration of real time multi-media services with non-real time services and person-to-machine communications. The IMS architecture for service provision is provided in FIG. 12.

IMS Entities

The IMS home network is responsible for making IMS services available to the user and for controlling and managing the access to these services. An IMS home network can be split into four main functional entities: the Interrogating Call Session Control Function (I-CSCF), the Serving Call Session Control Function (S-CSCF), the Proxy Call Session Control Function (P-CSCF) and the Home Subscriber Server (HSS). However, for simplicity in this brief explanation only the Serving Call Control Function (S-CSCF) 100 and the Home Subscriber Server (HSS) 102 are shown in FIG. 8. Other elements such as the IP Multimedia-Service Switching Function (IM-SSF) 103, the Multimedia Resource Function Control (MRFC) 105 and the CAMEL (Customized Applications for Mobile Networks Enhanced Logic) Service Environment 107 will not be discussed in this Annex.

The Serving Call Control Function (S-CSCF)

The Serving Call Control Function (S-CSCF) 100 is responsible for various signalling functions. The S-CSCF 100 performs service triggering. It can provide simple services to a user or more advanced services by interacting with an application server.

The Home Subscriber Server (HSS)

The Home Subscriber Server (HSS) 102 is an evolution of the Home Location Register (HLR) currently used in mobile networks. It contains information such as user identities, subscribed service or profile, service specific information, mobility management information, authorisation information and functions related to the IP multimedia domain. It handles authentication and location information.

IMS Application Servers

Figure 12:
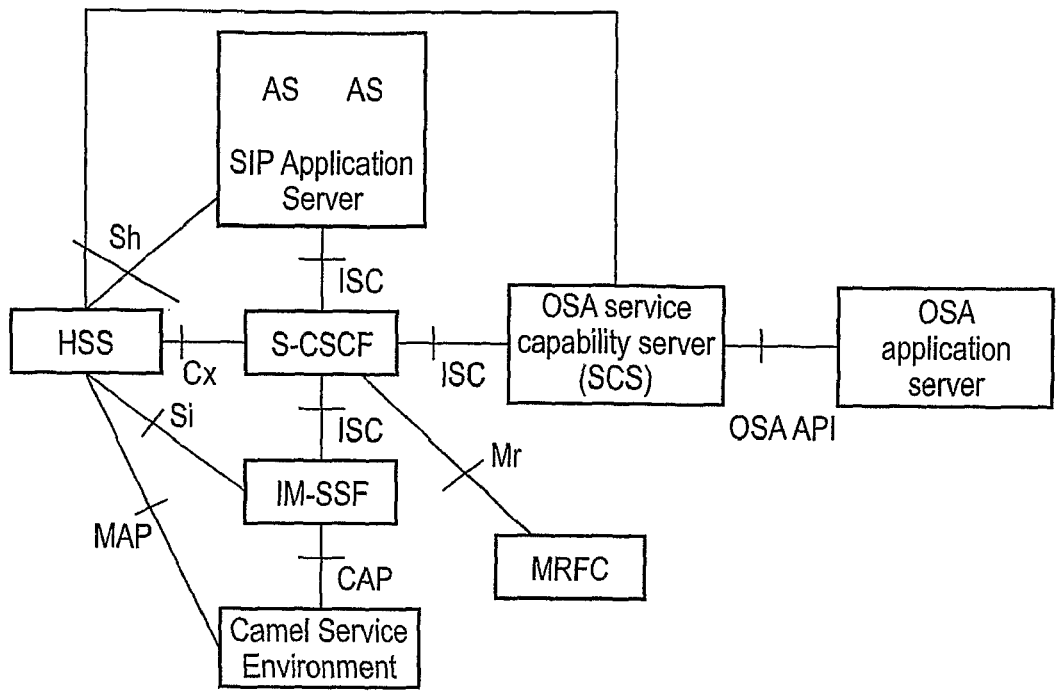
FIG. 12 is a schematic block diagram illustrating some parts of an Internet Protocol Multi-media Sub-system (IMS) network in accordance with a 3GPP standard.

Application servers are in charge of hosting service logic and handling service execution. There are three types of Application Servers (AS) defined in IMS specifications to deliver services to users: the SIP Application Server 108, the OSA (Open Service Architecture) Application Server 110 and the CAMEL Service environment 107. In order for Application Servers to deliver services to IMS subscribers, a number of interfaces have been defined between the Application Servers and IMS entities, as shown in FIG. 12. The main interfaces include the ISC Interface 112 and the Sh interface 114, which are explained in more detail below:

Sh Interface

The interface between the HSS 102 and the SIP AS 108 or the OSA SCS 110 is called the Sh interface 114. The Sh interface is an intra operator interface and is based on the DIAMETER protocol. DIAMETER is an Authentication, Authorisation, Accounting (AAA) protocol used to exchange information related to user profile.

The Sh interface 114 provides a facility for performing data handling procedures such as downloading data from the HSS 102 to the AS 108 and updating data in the HSS 102. The Sh interface 114 also handles subscription/notification procedures which enables the HSS to notify an Application Server of changes in data.

ISC Interface

In IMS specifications, the application servers, running the services, have been de-coupled from other network equipment and communicate with IMS through a standard interface. The interface between the S-CSCF 100 and the service platform(s) is called the ISC interface 112. The ISC interface is a standardised SIP-based interface. This ISC Interface is common to the SIP Application Server, the OSA Application Server and the CAMEL Application Server.

The IP Multimedia-Service Switching Function (IM-SSF):

The IM-SSF performs mediation between the S-CSCF and the CAMEL Application Protocol (CAP) and inter-working of SIP messages to the corresponding Customized Applications for Mobile Networks Enhanced Logic (CAMEL). In addition, Call State models are logically located within the IM-SSF which performs a mapping process between SIP methods passed across the ISC and CAMEL mechanisms, that will be used to initiate dialogue with the CAMEL service environment.

Annex 2: Mobile Packet Radio Network Architecture

Figure 13:
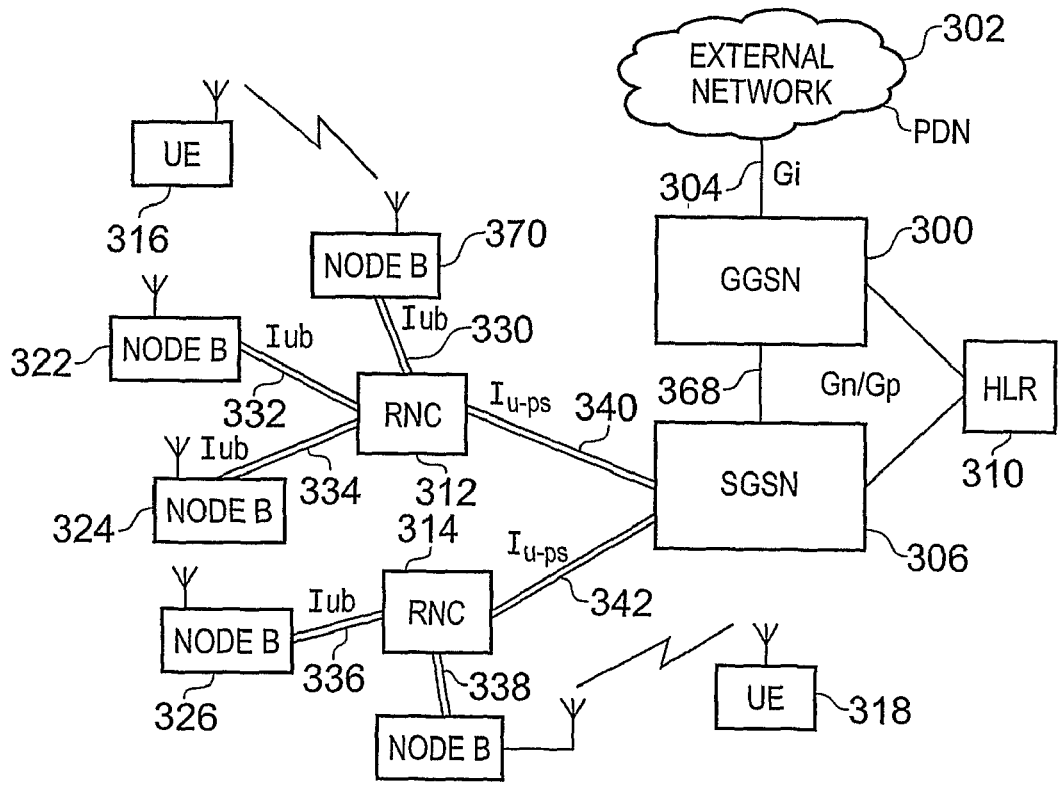
FIG. 13 is a schematic block diagram illustrating a GPRS network.

An example architecture of a mobile radio network which is arranged to support packet data communications is provided in FIG. 13. The terminology and architecture used in FIG. 13 corresponds to that used for the UMTS and that proposed for 3G as administered by the 3GPP. In FIG. 13, a Gateway GPRS Support Node (GGSN) is connected to an external Packet Data network 302,—(PDN). The external PDN communicates data as packets using the Internet Protocol (IP). An interface 304 between the GGSN and the external network is labelled Gi which has been standardised although further aspects are being standardised. Also connected to the GGSN is a Serving GPRS Support Node (SGSN) 306 via an interface 308 labelled as Gn/Gp which is also being standardised.

The GGSN and the SGSN are two network components, which are required to support the GPRS network. The GGSN acts as the gateway between the external packet data networks (PDN) and the mobile network, which supports the GPRS. The GGSN contains sufficient information to route incoming IP data packets to the SGSN that is serving a particular UE which is mobile and receives data via a radio access network provided by the mobile telecommunications network. For UMTS the radio access interface is provided in accordance with the Universal Terrestrial Radio Access Network (UTRAN) system which is specified in accordance with the— 3GPP standard. The SGSN is connected to the GGSN via a Gn interface if the SGSN is within the same Public Land Mobile Network (PLMN), and connected via the Gp interface to GGSNs belonging to other PLMNs.

An SGSN provides mobility management of UEs which are moving within an area supported by the mobile radio network. To this end, the SGSN is provided with access to a Home Location Register (HLR) 310. The SGSN is arranged to route data packets to Radio Network Controllers (RNC) 312, 314 for communication via the UTRAN radio access interface to mobile users UE 316, 318. The UTRAN radio access interface is provided using Node B apparatus 320, 322, 324, 326, 328, which effectively form base stations providing radio coverage for the area served by the mobile telecommunications network. The interface 330, 332, 334, 336, 338 between each RNC 312, 314 and the Node B apparatus 320, 322, 324, 326, 328, are labelled Iub and conform to an established or evolving standard. Similarly the interfaces 340, 342 between the SGSN and each RNC 312, 314 are labelled as Iu-ps and is an evolving standard. More details of the GPRS can be found in [4].

Annex 3: IPv4 UMTS Bearer Initiation Using PDP Context Activation

IP traffic (IPv6 or IPv4) is transported across a UMTS network (between UE and GGSN) using a UMTS bearer. A UMTS bearer is established using a PDP (Packet Data Protocol) Context. A user equipment UE sends IPv4 or IPv6 packets across the UMTS network by setting up IPv4 PDP Context or IPv6 PDP Context. IPv6 PDP Contexts are only supported in a IPv6 capable UMTS network, specifically SGSN and GGSN as well as UE capable of supporting the IP6 related functions (routing, security) in its network protocol stack.

Figure 14:
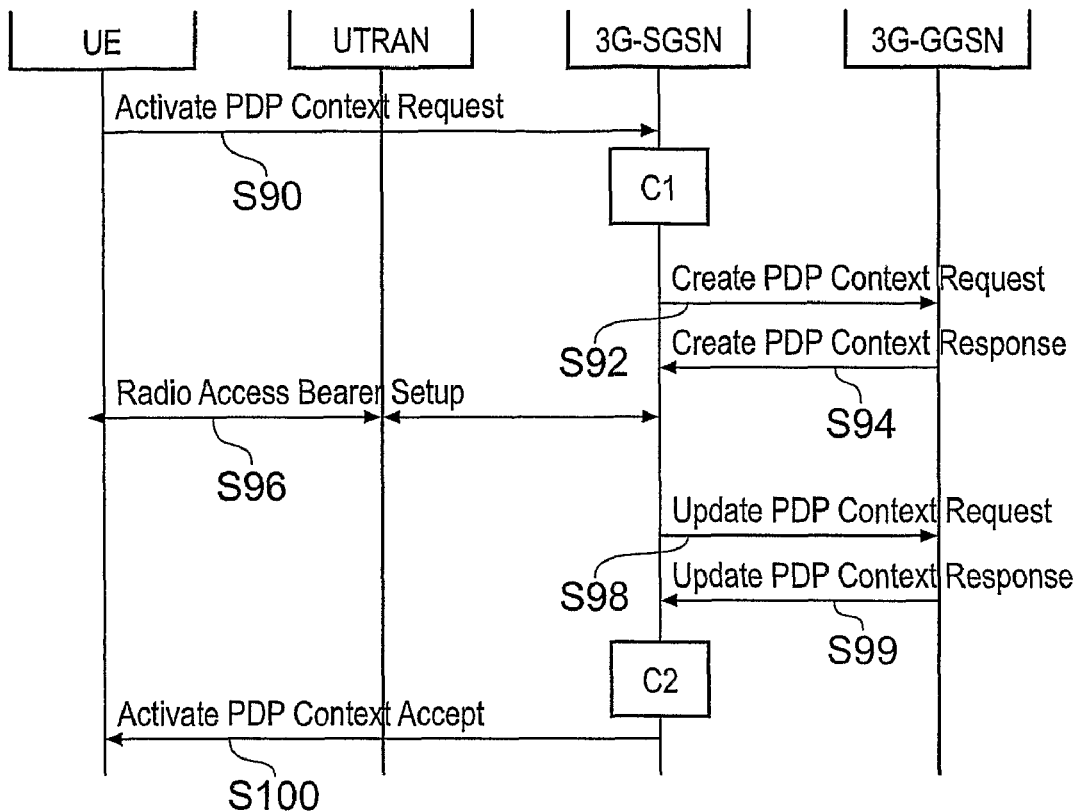
FIG. 14 is a flow diagram illustrating some of the process steps which are required to establish a bearer for internet packets across a GPRS network.

An IPv4 only UMTS network will only support IPv4 PDP Context, although there is no explicit difference between the establishment procedures for IPv4 PDP Context and IPv6 PDP Context. Address management and security within a PDP Context activation are highlighted in the following summary with reference to a flow diagram in FIG. 14. The flow diagram of FIG. 14 represents equivalently IPv4 for IPv4 PDP Context and IPv6 for IPv6 PDP Context for an IPv6 capable UMTS.

S90: The user equipment UE sends an activate PDP Context Request (NSAPI, TI, PDP Type, PDP Address, Access Point Name, QoS Requested, PDP Configuration Options) message to the SGSN. The user equipment UE uses a PDP address to indicate whether it requires the use of a static PDP address or whether it requires the use of a dynamic PDP address. The user equipment UE leaves PDP address empty to request a dynamic PDP address.

S92: The SGSN validates the Activate PDP Context Request using PDP Type (optional), PDP Address (optional), and Access Point Name (optional) provided by the user equipment UE and the PDP context subscription records.

If no GGSN address can be derived or if the SGSN has determined that the Activate PDP Context Request is not valid according to the rules, the SGSN rejects the PDP context activation request.

If a GGSN address can be derived, the SGSN creates a TEID for the requested PDP context. If the user equipment UE requests a dynamic address, the SGSN lets a GGSN allocate the dynamic address. The SGSN may restrict the requested QoS attributes given its capabilities and the current load, and it shall restrict the requested QoS attributes according to the subscribed QoS profile.

The SGSN sends a Create PDP Context Request (PDP Type, PDP Address, Access Point Name, QoS Negotiated, TEID, NSAPI, MSISDN, Selection Mode, Charging Characteristics, Trace Reference, Trace Type, Trigger Id, OMC Identity, PDP Configuration Options) message to the affected GGSN. The PDP Address is empty if-a dynamic address is to be requested.

S94: The GGSN creates a new entry in its PDP context table and generates a Charging Id. The new entry allows the GGSN to route PDP PDUs between the SGSN and the external PDP network, and to start charging. The GGSN handles Charging Characteristics, which may have been received from the SGSN, as defined in 3G TS 32.015[5]. The GGSN then returns a Create PDP Context Response (TEID, PDP Address, PDP Configuration Options, QoS Negotiated, Charging Id, and Cause) message to the SGSN. A PDP Address is included if the GGSN allocated a PDP address. If the GGSN has been configured by the operator to use External PDN Address Allocation for the requested APN, the PDP Address shall be set to 0.0.0.0, indicating that the PDP address shall be negotiated by the user equipment UE with the external PDN after completion of the PDP Context Activation procedure. The GGSN shall relay, modify and monitor these negotiations as long as the PDP context is in ACTIVE state, and use the GGSN-Initiated PDP Context Modification procedure to transfer the currently used PDP address to the SGSN and the user equipment UE. PDP Configuration Options contain optional PDP parameters that the GGSN may transfer to the user equipment UE. These optional PDP parameters may be requested by the user equipment UE in the Activate PDP Context Request message, or may be sent unsolicited by the GGSN. The PDP Configuration Options are sent transparently through the SGSN. The Create PDP Context messages are sent over the backbone network.

S 96: A radio access bearer is set-up in accordance with the PDP activation, including QoS negotiation. The PDP context request is then updated (S98) from the SGSN to the GGSN and the GGSN responds to the update (S99).

S 100: If the user equipment UE has requested a dynamic address, the PDP address received from the GGSN is inserted in the PDP context. The SGSN selects Radio Priority and Packet Flow Id based on QoS Negotiated, and returns an Activate PDP Context Accept (PDP Type, PDP Address, TI, QoS Negotiated, Radio Priority, Packet Flow Id, PDP Configuration Options) message to the user equipment UE. The SGSN is now able to route PDP PDUs between the GGSN and the user equipment UE, and to start charging. NSAPI (together with TI) is used to distinguish secondary PDP Contexts.

REFERENCES

[1] 3GPP TS23.221 "Architectural Requirements (Release 5)"
[2] RFC 2893
[3] RFC 2766 using SIIT(RFC 2765))
[4] R. Steele, C-C Lee and P. Gould, "GSM, cdmaOne and 3G Systems," published by Wiley International ISBN 0 471 491853
[5] 3G TS 32.015

The invention claimed is:

1. A telecommunications system for providing a facility for communication internet packet data in accordance with a first internet protocol via a packet radio system network configured to communicate internet packet data in accordance with a second internet protocol, the system including at least one mobile user equipment and an inter-working unit, the mobile user equipment including a first internet protocol stack operable in accordance with the first internet protocol and a second internet protocol stack operable in accordance with a second internet protocol, the user equipment being configured to acquire an address according to the second internet protocol from the packet radio system network by sending an Activate Packet Data Protocol Context request message to the packet radio system network and receiving the second internet protocol address from the packet radio system, the inter-working unit is configured to perform an inter-working operation to represent internet packet data according to the first internet protocol as internet packet data according to the second internet protocol for communication via the packet radio system network and to represent internet packet data received from the packet radio system network in the form of internet packet data according to the second internet protocol as internet packet data according to the first internet protocol for communication to the user equipment, a corresponding inter-working unit being provided for reciprocal communication of internet packet data to and from the packet radio system network, wherein the inter-working unit acquires from the second internet protocol stack an address for representing the internet packet data according to the first internet protocol as internet packet data according to the second internet protocol, and a service-based policy translator (SBLP-T) configured to receive a first authorization information from a policy control function (PCF) and to translate the first authorization information according to the first internet protocol into second authorization information according to the second internet protocol for allowing communication of the internet packet data according to the second internet protocol via the packet radio system network.

2. The telecommunication system as claimed in claim 1, wherein the user equipment acquires the address according to the first internet protocol from a server via an external network by communicating with the server using a bearer channel according to the second internet protocol formed by the packet radio system network.

3. The telecommunications systems as claimed in claim 2, wherein the internet protocol address according to the first internet protocol is acquired from the server in accordance with a stateful protocol (DHCPv6).

4. The telecommunications system as claimed in claim 3, wherein the inter-working operation is a tunnelling process and further, wherein the inter-working unit includes a tunnelling processor operable in accordance with the tunnelling process to encapsulate the internet protocol data according to the first internet protocol as tunnelling protocol unites according to the second internet protocol for communication via the packet radio system network, and to the de-encapsulate internet protocol data according to the second internet protocol received from the packet radio system network as tunnelling protocol units.

5. The telecommunications system as claimed in claim 4, wherein the address according to the second internet protocol of the user equipment is compatible with the address according to the first internet protocol, and the tunnelling processor is configured to convert automatically the address of the user equipment according to the second internet protocol into the address of the user equipment according to the first internet protocol and to convert automatically the address of the user equipment according to the first internet protocol into the address of the user equipment according to the second internet protocol.

6. The telecommunications system as claimed in claim 3, wherein the inter-working operation is a protocol translation and the inter-working unit acquires from the first internet protocol stack an address for representing the internet packet data according to the second internet protocol as internet packet data according to the first internet protocol for communication to the user equipment, wherein the inter-working unit includes a protocol translator operable in accordance with the protocol translation to convert a header of the internet packet data according to the first internet protocol into a header in accordance with the second internet protocol for communication via the packet radio system network, and to convert a header of the internet packet data according to the second internet protocol into a header in accordance with the first internet protocol for the user equipment.

7. The telecommunications system as claimed in claim 2, wherein the inter-working operation is a tunnelling process and further, wherein the inter-working unit includes a tunnelling processor operable in accordance with the tunnelling process to encapsulate the internet protocol data according to the first internet protocol as tunnelling protocol unites according to the second internet protocol for communication via the packet radio system network, and to the de-encapsulate internet protocol data according to the second internet protocol received from the packet radio system network as tunnelling protocol units.

8. The telecommunications system as claimed in claim 7, wherein the address according to the second internet protocol of the user equipment is compatible with the address according to the first internet protocol, and the tunnelling processor is configured to convert automatically the address of the user equipment according to the second internet protocol into the address of the user equipment according to the first internet protocol and to convert automatically the address of the user equipment according to the first internet protocol into the address of the user equipment according to the second internet protocol.

9. The telecommunications system as claimed in claim 2, wherein the inter-working operation is a protocol translation and the inter-working unit acquires from the first internet protocol stack an address for representing the internet packet data according to the second internet protocol as internet packet data according to the first internet protocol for communication to the user equipment, wherein the inter-working unit includes a protocol translator operable in accordance with the protocol translation to convert a header of the internet packet data according to the first internet protocol into a header in accordance with the second internet protocol for communication via the packet radio system network, and to convert a header of the internet packet data according to the second internet protocol into a header in accordance with the first internet protocol for the user equipment.

10. The telecommunications system as claimed in claim 1, wherein the inter-working operation is a tunnelling process and further wherein the inter-working unit includes a tunnelling processor operable in accordance with the tunnelling process to encapsulate the internet protocol data according to the first internet protocol as tunnelling protocol units according to the second internet protocol for communication via the packet radio system network, and to de-encapsulate internet protocol data according to the first internet protocol from internet packet data according to the second internet protocol received from the packet radio system network as tunnelling protocol units.

11. The telecommunications system as claimed in claim 10, wherein the address according to the second internet protocol of the user equipment is compatible with the address according to the first internet protocol, and the tunnelling processor is configured to convert automatically the address of the user equipment according to the second internet protocol into the address of the user equipment according to the first internet protocol and to convert automatically the address of the user equipment according to the first internet protocol into the address of the user equipment according to the second internet protocol.

12. The telecommunications system as claimed in claim 1, wherein the inter-working operation is a protocol translation and the inter-working unit acquires from the first internet protocol stack an address for representing the internet packet data according to the second internet protocol as internet packet data according to the first internet protocol for communication to the user equipment, wherein the inter-working unit includes a protocol translator operable in accordance with the protocol translation to convert a header of the internet packet data according to the first internet protocol into a header in accordance with the second internet protocol for communication via the packet radio system network, and to convert a header of the internet packet data according to the second internet protocol into a header in accordance with the first internet protocol for the user equipment.

13. The telecommunications system as claimed in claim 1, wherein the policy control function (PCF) is configured to provide the first authorization information specifying conditions for allowing internet packet data according to the first internet protocol to be communicated between the user equipment and a correspondent node,
wherein the packet radio system network includes
a service-based local policy (SBLP) enforcer configured to receive the second authorization information according to the second internet protocol and to allow ingress or egress of internet packet data according to the second internet protocol to or from the packet radio system network according to the received second authorization information.

14. The telecommunications system as claimed in claim 13, wherein the first internet protocol is IPV6 and the second internet protocol is IPV4, and the first authorization information for the first internet protocol includes information pertaining to a traffic class object allowed and packet classifier information including at least one of source and destination addresses according to the first internet protocol which are allowed for internet packet data, the service-based policy translator configured to form the second authorization information by translating the traffic class object into type of service information and the packet classifier information into packet classifier information according to the second internet protocol including at least one of source and destination addresses according to the second internet protocol which are allowed for internet packet data communicated via the packet radio system network.

15. The telecommunications system as claimed in claim 1, wherein the internet packet data according to the first internet protocol includes signalling messages sent to an Internet Protocol Multi-media Sub-system (IMS) network.

16. A method of communicating internet packet data in accordance with a first internet protocol via a packet radio system network configured to communicate internet packet data in accordance with a second internet protocol, the user equipment having a first internet protocol stack operable in accordance with the first internet protocol and a second internet protocol stack operable in accordance with a second internet protocol, the method comprising
acquiring an address according to the second internet protocol from the packet radio system network by sending an Activate Packet Data Protocol Context request message to the packet radio system network from the mobile user equipment and receiving the second internet protocol address from the packet radio system, performing an inter-working operation, using an inter-working unit, to represent internet packet data according to the first internet protocol as internet packet data according to the second internet protocol for communication via the packet radio system network, and to represent internet packet data received from the packet radio system network in the form of internet packet data according to the second internet protocol as internet packet data according to the first internet protocol for communication to the user equipment, a corresponding inter-working unit being provided for reciprocal communication of internet packet data to and from the packet radio system network, wherein the representing the first internet protocol as internet packet data according to the second internet protocol includes acquiring from the second internet protocol stack an address for representing the internet packet data according to the first internet protocol as internet packet data according to the second internet protocol, and translating first authorization information according to the first internet protocol into second authorization information according to the second internet protocol for allowing communication of the internet packet data according to the second internet protocol to be communicated via the packet radio system network.

17. The method as claimed in claim 16, the method comprising acquiring the address according to the first internet protocol from a server via an external network by communicating with the server using a bearer channel according to the second internet protocol formed by the packet radio system network.

18. The method as claimed in claim 17, wherein the acquiring the internet protocol address according to the first internet protocol includes acquiring the address from the server in accordance with a stateful protocol (DHCPv6).

19. The method as claimed in claim 18, wherein the inter-working operation is a tunnelling process and further, wherein the tunnelling process for representing internet packet data according to the first internet protocol as internet packet data according to the second internet protocol, includes encapsulating the internet protocol data according to the first internet protocol as tunnelling protocol units according to the second internet protocol for communication via the packet radio system network, and the representing the internet packet data for communication to the user equipment according to the first internet protocol received from the packet radio system network as tunnelling protocol units according to the second internet protocol, includes de-encapsulating internet protocol data according to the first internet protocol from internet packet data according to the second internet protocol received from the packet radio system network.

20. The method as claimed in claim 19, wherein the address according to the second internet protocol of the user equipment is compatible with the address according to the first internet protocol, the encapsulating including converting automatically the address of the user equipment according to the second internet protocol into the address of the user equipment according to the first internet protocol, and the de-encapsulating including converting automatically the address of the user equipment according to the first internet protocol into the address of the user equipment according to the second internet protocol.

21. The method as claimed in claim 17, wherein the inter-working operation is a tunnelling process and further, wherein the tunnelling process for representing internet packet data according to the first internet protocol as internet packet data according to the second internet protocol, includes encapsulating the internet protocol data according to the first internet protocol as tunnelling protocol units according to the second internet protocol for communication via the packet radio system network, and the representing the internet packet data for communication to the user equipment according to the first internet protocol received from the packet radio system network as tunnelling protocol units according to the second internet protocol, includes de-encapsulating internet protocol data according to the first internet protocol from internet packet data according to the second internet protocol received from the packet radio system network.

22. The method as claimed in claim 21, wherein the address according to the second internet protocol of the user equipment is compatible with the address according to the first internet protocol, the encapsulating including converting automatically the address of the user equipment according to the second internet protocol into the address of the user equipment according to the first internet protocol, and the de-encapsulating including converting automatically the address of the user equipment according to the first internet protocol into the address of the user equipment according to the second internet protocol.

23. The method as claimed in claim 16, wherein the inter-working operation is a tunnelling process and further, wherein the tunnelling process for representing internet packet data according to the first internet protocol as internet packet data according to the second internet protocol, includes encapsulating the internet protocol data according to the first internet protocol as tunnelling protocol units according to the second internet protocol for communication via the packet radio system network, and the representing the internet packet data for communication to the user equipment according to the first internet protocol received from the packet radio system network as tunnelling protocol units according to the second internet protocol, includes de-encapsulating internet protocol data according to the first internet protocol from internet packet data according to the second internet protocol received from the packet radio system network.

24. The method as claimed in claim 23, wherein the address according to the second internet protocol of the user equipment is compatible with the address according to the first internet protocol, the encapsulating including converting automatically the address of the user equipment according to the second internet protocol into the address of the user equipment according to the first internet protocol, and the de-encapsulating including converting automatically the address of the user equipment according to the first internet protocol into the address of the user equipment according to the second internet protocol.

25. The method as claimed in claim 16, wherein the inter-working operation is a protocol translation wherein the representing the internet packet data according to the second internet protocol as internet packet data according to the first internet protocol, includes
  acquiring from the first internet protocol stack an address for representing the internet packet data according to the second internet protocol as internet packet data according to the first internet protocol for communication to the mobile user equipment,
  wherein the protocol translation for representing the internet packet data according to the first internet protocol as internet packet data according to the second internet protocol, comprises
  translating the internet packet data according to the first internet protocol as internet packet data according to the second internet protocol, the translating including
  converting a header of the internet packet data according to the first internet protocol into a header in accordance with the second internet protocol for communication via the packet radio system network, and the representing the internet packet data received from the packet radio system network in the form of the second internet protocol as internet packet data according to the first internet protocol, comprises
  translating the internet packet data according to the second internet protocol as internet packet data according to the first internet protocol, the translating including
  converting a header of the internet packet data according to the second internet protocol into a header in accordance with the first internet protocol for communication to the user equipment.

26. The method as claimed in claim 16, the method comprising providing the first authorization information specifying condition for allowing internet packet data according to the first internet protocol to be communicated between the user equipment and a correspondent node,
  receiving the second authorization information according to the second internet protocol at a serviced-based local policy enforcer within the packet radio system network, and
  allowing ingress or egress of internet packet data according to the second internet protocol to or from the packet radio system network according to the received second authorization information.

27. The method as claimed in claim 26, wherein first internet protocol is IPV6 and the second internet protocol is IPV4, and the first authorization information for the first internet protocol includes information pertaining to a traffic class object allowed and packet classifier information including at least one of source and destination addresses according to the first internet protocol which are allowed for internet packet data, the generating the second authorization information according to the second internet protocol including
  translating the traffic class object into type of service information, and
  translating the packet classifier information into packet classifier information according to the second internet protocol including at least one of source and destination addresses according to the second internet protocol which are allowed for the internet packet data according to the second internet protocol.

28. The method as claimed in claim 16, wherein the internet packet data according to the first internet protocol includes signalling messages sent to an Internet Protocol Multi-media Sub-system (IMS) network.

29. A mobile user equipment operable in association with an inter-working unit to communicate internet packet data in accordance with a first internet protocol via a packet radio system network configured to communicate internet packet data in accordance with a second internet protocol, the inter-working unit being configured to represent internet packet data according to the first internet protocol as internet packet data according to the second internet protocol for communication via the packet radio system network and to represent internet packet data received from the packet radio system network in the form of internet packet data according to the second internet packet protocol as internet packet data according to the first internet protocol for communication to the user equipment, by performing an inter-working operation, a corresponding inter-working unit being provided for reciprocal communication of internet packet data to and from the packet radio system network, and a service-based policy translator (SBLP-T) configured to receive a first authorization information from a policy control function (PCF) and to translate the first authorization information according to the first internet protocol into second authorization information according to the second internet protocol for allowing communication of the internet packet data according to the second internet protocol via the packet radio system network, the user equipment including
  a first internet protocol stack operable in accordance with the first internet protocol and a second internet protocol stack operable in accordance with a second internet protocol, the second protocol stack being configured
  to acquire an address according to the second internet protocol from the packet radio system network by sending an Activate Packet Data Protocol Context request message to the packet radio system network and receiving the second internet protocol address from the packet radio system, the inter-working unit acquiring from the second internet protocol stack an address for representing the internet packet data according to the first internet protocol as internet packet data according to the second internet protocol.

30. A service-based policy translator (SBLP-T) configured to receive first authorization information from a policy control function of an internet protocol multi-media system (IMS) network and to translate the first authorization information according to a first internet protocol into second authorization information according to a second internet protocol for allowing communication of internet packet data according to the second internet protocol via a packet radio system network.

31. The service-based policy translator as claimed in claim 30, wherein the first internet protocol is IPV6 and the second internet protocol is IPV4, and the first authorization information for the first internet protocol includes information pertaining to a traffic class object allowed and packet classifier information including at least one of source and destination addresses according to the first internet protocol which are allowed for internet packet data, the service-based policy translator being configured to form the second authorization information by translating the traffic class object into type of service information and the packet classifier information into packet classifier information according to the second internet protocol including at least one of source and destination addresses according to the second internet protocol which are allowed for internet packet data.

32. A method of enforcing a service-based policy in a packet radio network according to first authorization information according to a first internet protocol, the method comprising receiving the first authorization information from a policy control function of an internet protocol multi-media system (IMS) network, translating the first authorization information according to the first internet protocol into second authorization information according to a second internet protocol for allowing communication of the internet packet data according to the second internet protocol via the packet radio system network.

33. The method as claimed in claim 32, wherein the first internet protocol is IPV6 and the second internet protocol is IPV4, and the first authorization information for the first internet protocol includes information pertaining to a traffic class object allowed and packet classifier information including at least one of source and destination addresses according to the first internet protocol which are allowed for internet packet data, the service-based policy translator being configured to form the second authorization information by translating the traffic class object into type of service information and the packet classifier information into packet classifier information according to the second internet protocol including at least one of source and destination addresses according to the second internet protocol which are allowed for communicating internet packet data.

34. A data processor configured to communicate internet packet data in accordance with a first internet protocol via a packet radio system network configured to communicate the internet packet data in accordance with a second internet protocol, wherein user equipment has a first internet protocol stack operable in accordance with the first internet protocol and a second internet protocol stack operable in accordance with a second internet protocol, wherein communicating internet packet data comprises acquiring an address according to the second internet protocol from the packet radio system network by sending an Activate Packet Data Protocol Context request message to the packet radio system network from the mobile user equipment and receiving the second internet protocol address from the packet radio system, performing an inter-working operation, using an inter-working unit, to represent internet packet data according to the first internet protocol as internet packet data according to the second internet protocol for communication via the packet radio system network, and to represent internet packet data received from the packet radio system network in the form of internet packet data according to the second internet protocol as internet packet data according to the first internet protocol for communication to the user equipment, a corresponding inter-working unit being provided for reciprocal communication of internet packet data to and from the packet radio system network, wherein the representing the first internet protocol as internet packet data according to the second internet protocol includes acquiring from the second internet protocol stack an address for representing the internet packet data according to the first internet protocol as internet packet data according to the second internet protocol, and a service-based policy translator (SBLP-T) configured to receive a first authorization information from a policy control function (PCF) and to translate the first authorization information according to the first internet protocol into second authorization information according to the second internet protocol for allowing communication of the internet packet data according to the second internet protocol via the packet radio system network.

35. A data processor configured to enforce a service-based policy in a packet radio network according to first authorization information according to a first internet protocol, wherein enforcing a service-based policy comprises receiving the first authorization information from a policy control function of an internet protocol multi-media system (IMS) network, translating the first authorization information according to the first internet protocol into second authorization information according to a second internet protocol for allowing communication of the internet packet data according to the second internet protocol via the packet radio system network.

36. The data processor as claimed in claim 35, wherein the first internet protocol is IPV6 and the second internet protocol is IPV4, and the first authorization information for the first internet protocol includes information pertaining to a traffic class object allowed and packet classifier information including at least one of source and destination addresses according to the first internet protocol which are allowed for internet packet data, the service-based policy translator being configured to form the second authorization information by translating the traffic class object into type of service information and the packet classifier information into packet classifier information according to the second internet protocol including at least one of source and destination addresses according to the second internet protocol which are allowed for communicating internet packet data.

* * * * *

UNITED STATES PATENT AND TRADEMARK OFFICE
CERTIFICATE OF CORRECTION

PATENT NO.      : 7,907,618 B2
APPLICATION NO. : 11/587073
DATED           : March 15, 2011
INVENTOR(S)     : Xiaobao Chen It is certified that error appears in the above-identified patent and that said Letters Patent is hereby corrected as shown below:

Title Page; item (57);

Please replace the Abstract with the following:

A telecommunications system provides a facility for communicating internet packet data with a first internet protocol. The system comprises user equipment including a first internet protocol stack operable with a first internet protocol and a second internet protocol stack operable with a second internet protocol. The system includes a packet radio system network operable to communicate internet packet data with the second internet protocol and an inter-working. The inter-working unit is operable with the user equipment to represent internet packet data according to the first internet protocol as internet packet data according to the second internet protocol for communication via the packet radio system network. The inter-working-unit represents internet packet data received from the packet radio system network in the form of internet packet data according to the second internet protocol as internet packet data according to the first internet protocol for communication to the user equipment.

Signed and Sealed this
Twenty-fourth Day of May, 2011

David J. Kappos
*Director of the United States Patent and Trademark Office*